(12) United States Patent
Franzaroli

(10) Patent No.: US 12,234,047 B2
(45) Date of Patent: Feb. 25, 2025

(54) UNIT OR AN APPARATUS FOR CONTROLLING OR MANAGING PRODUCTS OR ROLLS

(71) Applicant: PULSAR S.R.L., Castel Maggiore (IT)

(72) Inventor: Massimo Franzaroli, Castel Maggiore (IT)

(73) Assignee: PULSAR S.R.L., Castel Maggiore (IT)

( * ) Notice: Subject to any disclaimer, the term of this patent is extended or adjusted under 35 U.S.C. 154(b) by 0 days.

(21) Appl. No.: 16/870,617

(22) Filed: May 8, 2020

(65) Prior Publication Data

US 2020/0307839 A1 Oct. 1, 2020

Related U.S. Application Data

(62) Division of application No. 15/550,920, filed as application No. PCT/IB2016/051035 on Feb. 25, 2016, now Pat. No. 10,676,223.

(30) Foreign Application Priority Data

Feb. 27, 2015 (IT) .......................... BO2015U000016
May 4, 2015 (IT) .......................... BO2015U000039
Jun. 19, 2015 (IT) ........................ 202015000025907

(51) Int. Cl.
  *B65B 25/14* (2006.01)
  *B65B 11/58* (2006.01)
  (Continued)

(52) U.S. Cl.
  CPC .......... *B65B 25/146* (2013.01); *B65B 11/585* (2013.01); *B65B 35/10* (2013.01);
  (Continued)

(58) Field of Classification Search
  CPC ..... B65B 25/146; B65B 11/585; B65B 35/10; B65B 57/00; B65B 57/02; B65B 57/10;
  (Continued)

(56) References Cited

U.S. PATENT DOCUMENTS 3,098,565 A 7/1963 Fouse et al.
4,308,959 A * 1/1982 Hoover ................. B07C 5/3422
  209/939
(Continued)

FOREIGN PATENT DOCUMENTS

CN 104142349 A 11/2014
EP 0854090 A1 7/1998
(Continued)

OTHER PUBLICATIONS

European Office Action dated Jul. 30, 2019 for related European Patent Application No. 16719477.8.
(Continued)

*Primary Examiner* — Kyle O Logan
(74) *Attorney, Agent, or Firm* — SHUTTLEWORTH & INGERSOLL, PLC; Timothy J. Klima

(57) ABSTRACT

A unit for control or management of products, including rolls of paper material, includes a plant including an operating line including at least one upstream section including a log saw for cutting rolls off elongate logs, a packaging section for primary packaging, including a packing section where the rolls are packed, and a bagging section where the packs are placed in bags and/or a palletizing section where the packs or bags are placed on pallets. A conveying section transports products between one section of the plant and another, in particular between the upstream section and the packaging section and/or between one packaging section and another downstream. A process controller controls the functioning of the plant sections. The unit includes a device for eliminating a defective product or roll.

23 Claims, 30 Drawing Sheets

(51) Int. Cl.
- *B65B 35/10* (2006.01)
- *B65B 57/00* (2006.01)
- *B65B 57/02* (2006.01)
- *B65B 57/10* (2006.01)
- *B65B 65/00* (2006.01)
- *G01N 21/90* (2006.01)
- *G01N 21/95* (2006.01)
- *G06T 7/00* (2017.01)
- *B65B 11/00* (2006.01)

(52) U.S. Cl.
CPC .............. *B65B 57/00* (2013.01); *B65B 57/02* (2013.01); *B65B 57/10* (2013.01); *B65B 65/006* (2013.01); *G01N 21/90* (2013.01); *G01N 21/95* (2013.01); *G06T 7/0002* (2013.01); *G06T 7/0004* (2013.01); *G06T 7/0006* (2013.01); *G06T 7/0008* (2013.01); *G06T 7/001* (2013.01); *B65B 11/00* (2013.01); *B65B 2210/02* (2013.01); *G06T 2207/30108* (2013.01); *G06T 2207/30124* (2013.01)

(58) Field of Classification Search
CPC ... B65B 65/006; B65B 11/00; B65B 2210/02; G01N 21/95
See application file for complete search history.

(56) References Cited

U.S. PATENT DOCUMENTS

| | | | | | |
|---|---|---|---|---|---|
| 4,593,806 | A | * | 6/1986 | Tappe | B65G 47/5122 198/437 |
| 5,255,495 | A | | 10/1993 | Kovacs | |
| 5,917,034 | A | | 6/1999 | Brown | |
| 5,917,934 | A | * | 6/1999 | Chiu | G06T 7/0006 348/125 |
| 6,054,665 | A | | 4/2000 | Focke et al. | |
| 6,373,519 | B1 | * | 4/2002 | Sybert | G01N 21/88 348/86 |
| 6,994,206 | B2 | * | 2/2006 | Adamski | B65B 25/146 198/570 |
| 8,073,239 | B1 | | 12/2011 | Bahrami | |
| 2001/0012381 | A1 | | 8/2001 | Sari-Sarraf | |
| 2001/0028732 | A1 | | 10/2001 | Coulombe | |
| 2001/0042359 | A1 | * | 11/2001 | Franzaroli | G05B 19/41865 53/435 |
| 2002/0108353 | A1 | * | 8/2002 | Franzaroli | B65B 35/44 53/435 |
| 2004/0030514 | A1 | | 2/2004 | Popp | |
| 2004/0123570 | A1 | * | 7/2004 | Franzaroli | B65B 35/44 53/493 |
| 2007/0058840 | A1 | | 3/2007 | Singh | |
| 2010/0082152 | A1 | | 4/2010 | Mishra | |
| 2010/0276344 | A1 | * | 11/2010 | Yamada | B07C 5/342 209/552 |
| 2010/0292828 | A1 | * | 11/2010 | Einarsson | B07C 99/00 83/13 |
| 2012/0120229 | A1 | | 5/2012 | Brantley et al. | |
| 2014/0091013 | A1 | * | 4/2014 | Streufert | B65G 47/46 209/552 |
| 2014/0146169 | A1 | | 5/2014 | Ollivier et al. | |
| 2014/0226892 | A1 | | 8/2014 | Kral et al. | |
| 2014/0247347 | A1 | | 9/2014 | McNeill | |
| 2014/0290180 | A1 | | 10/2014 | Olbrich et al. | |
| 2014/0300734 | A1 | | 10/2014 | Binetruy | |
| 2015/0001137 | A1 | * | 1/2015 | Layne | B65G 37/00 209/552 |
| 2015/0212010 | A1 | | 7/2015 | Lin | |
| 2015/0241341 | A1 | | 8/2015 | Ikeda | |
| 2015/0241360 | A1 | | 8/2015 | Niemela et al. | |
| 2015/0264319 | A1 | * | 9/2015 | Wood | B65B 19/30 348/125 |
| 2017/0191946 | A1 | | 7/2017 | Smith | |
| 2018/0008104 | A1 | | 1/2018 | Becker | |
| 2018/0099769 | A1 | * | 4/2018 | McDonald | B65B 57/04 |

FOREIGN PATENT DOCUMENTS

| | | | |
|---|---|---|---|
| GB | 1367105 | A | 9/1974 |
| GB | 2102758 | A | 2/1983 |
| JP | 2009186193 | A | 8/2009 |
| WO | 2007144920 | A1 | 12/2007 |
| WO | 2008117150 | A2 | 10/2008 |
| WO | 2013054719 | A1 | 4/2013 |

OTHER PUBLICATIONS

European Search Report dated Jul. 26, 2019 for related European Patent Application No. 19167874.
European Office Action dated Aug. 15, 2018 for related European Patent Application No. 16719477.8.
European Office Action dated Aug. 15, 2018 for related European Patent Application No. 16718448.0.
International Search Report dated Aug. 31, 2016 for counterpart International Patent Application No. PCT/IB2016/051035.
International Search Report dated Jun. 10, 2016 for counterpart International Patent Application No. PCT/IB2016/051029.
International Search Report dated Aug. 31, 2016 for counterpart International Patent Application No. PCT/IB2016/051031.
Franzaroli, Massimo—U.S. Appl. No. 17/146,166, filed Jan. 11, 2021.
Franzaroli, Massimo—U.S. Appl. No. 15/550,242, filed Aug. 10, 2017.
Franzaroli, Massimo—U.S. Appl. No. 15/550,920, filed Feb. 25, 2016.
Franzaroli, Massimo—U.S. Appl. No. 15/550,950, filed Aug. 14, 2017.
European Search Report dated Feb. 18, 2021 for related European Patent Application No. 20197174.4.
European Search Report dated Oct. 20, 2021 for related European Patent Application No. 20207907.5.
European Search Report dated Feb. 18, 2021 for related European Patent App No. 20197174.4.

* cited by examiner

55'  55'  55'

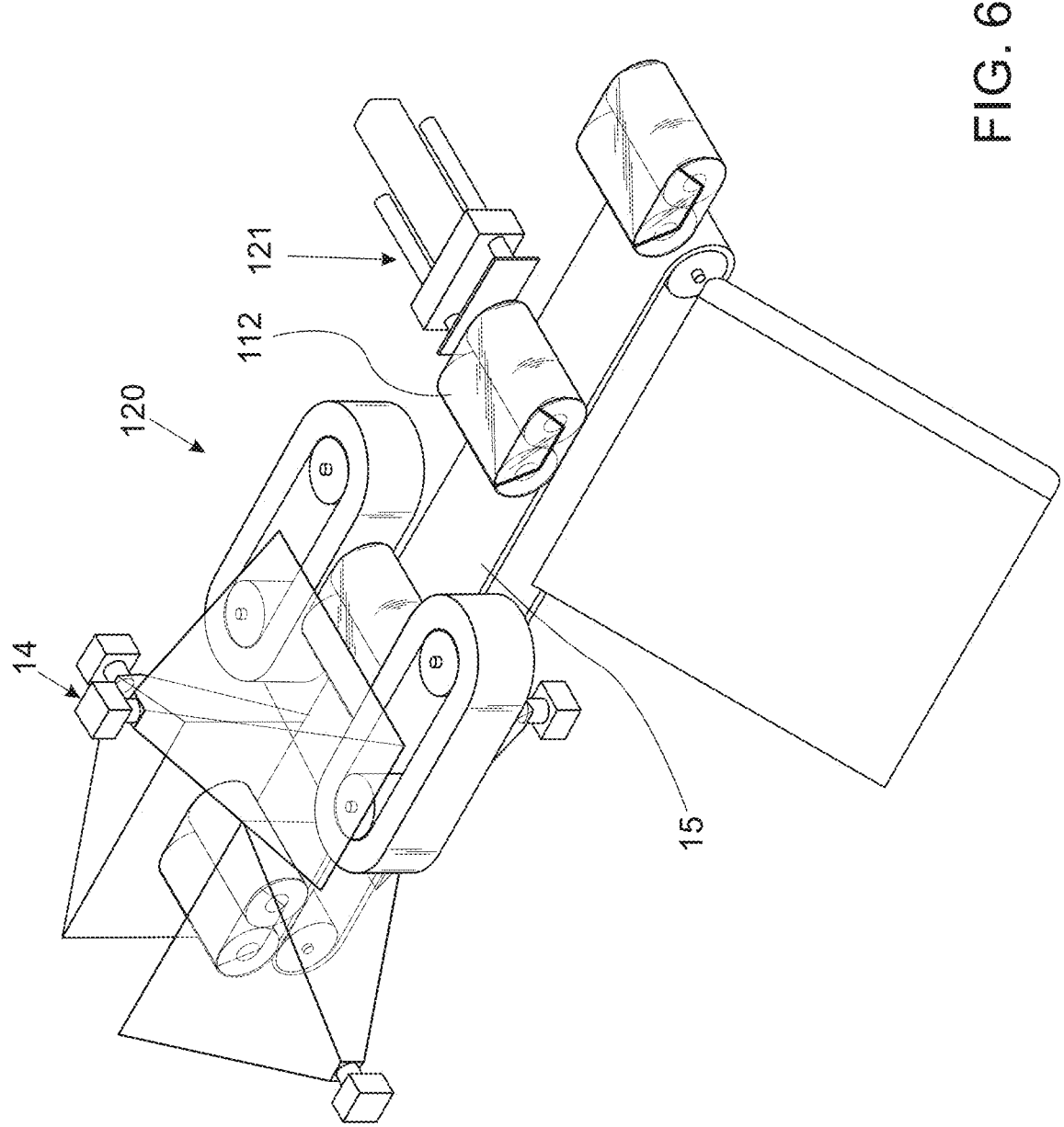

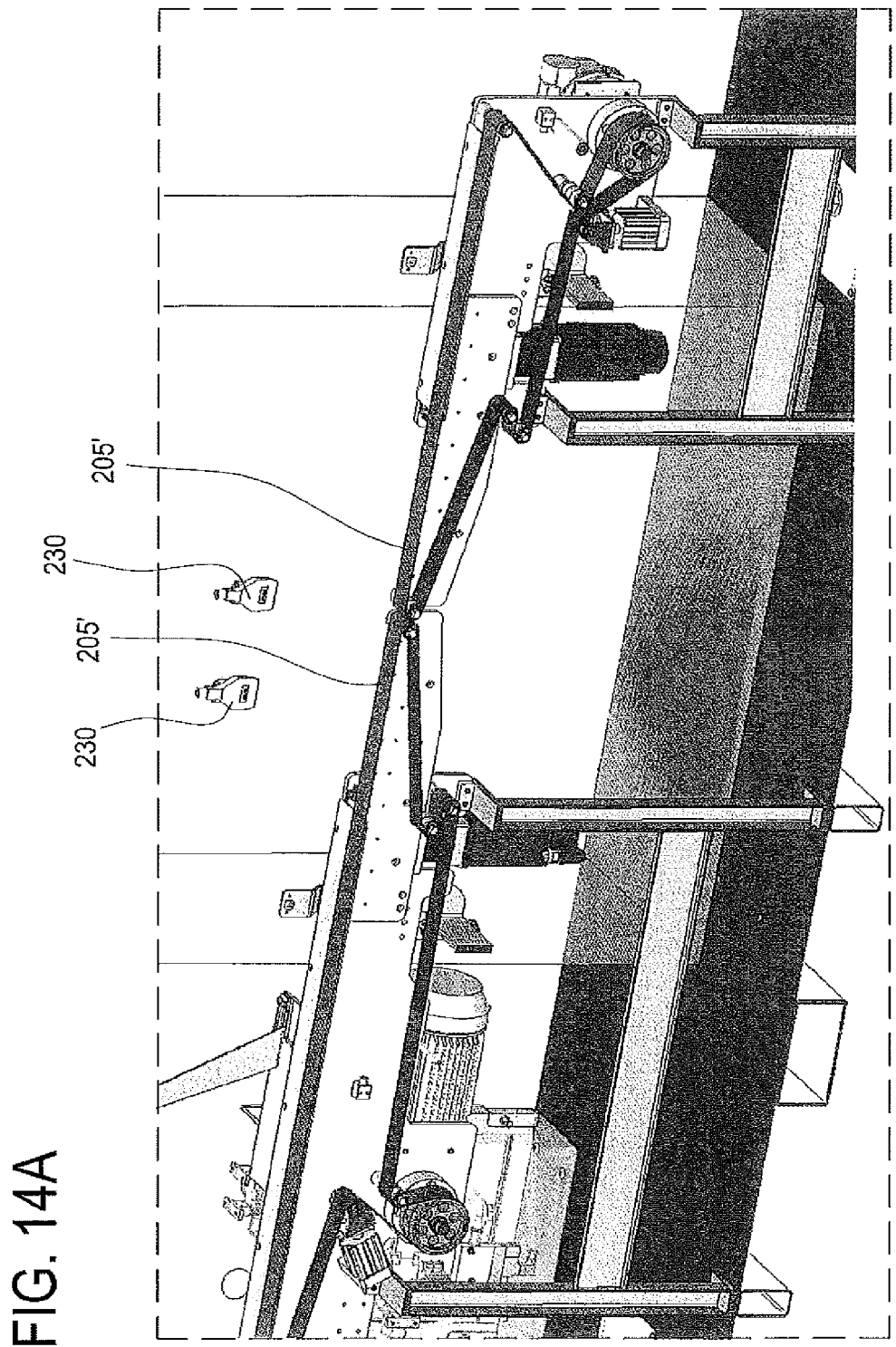

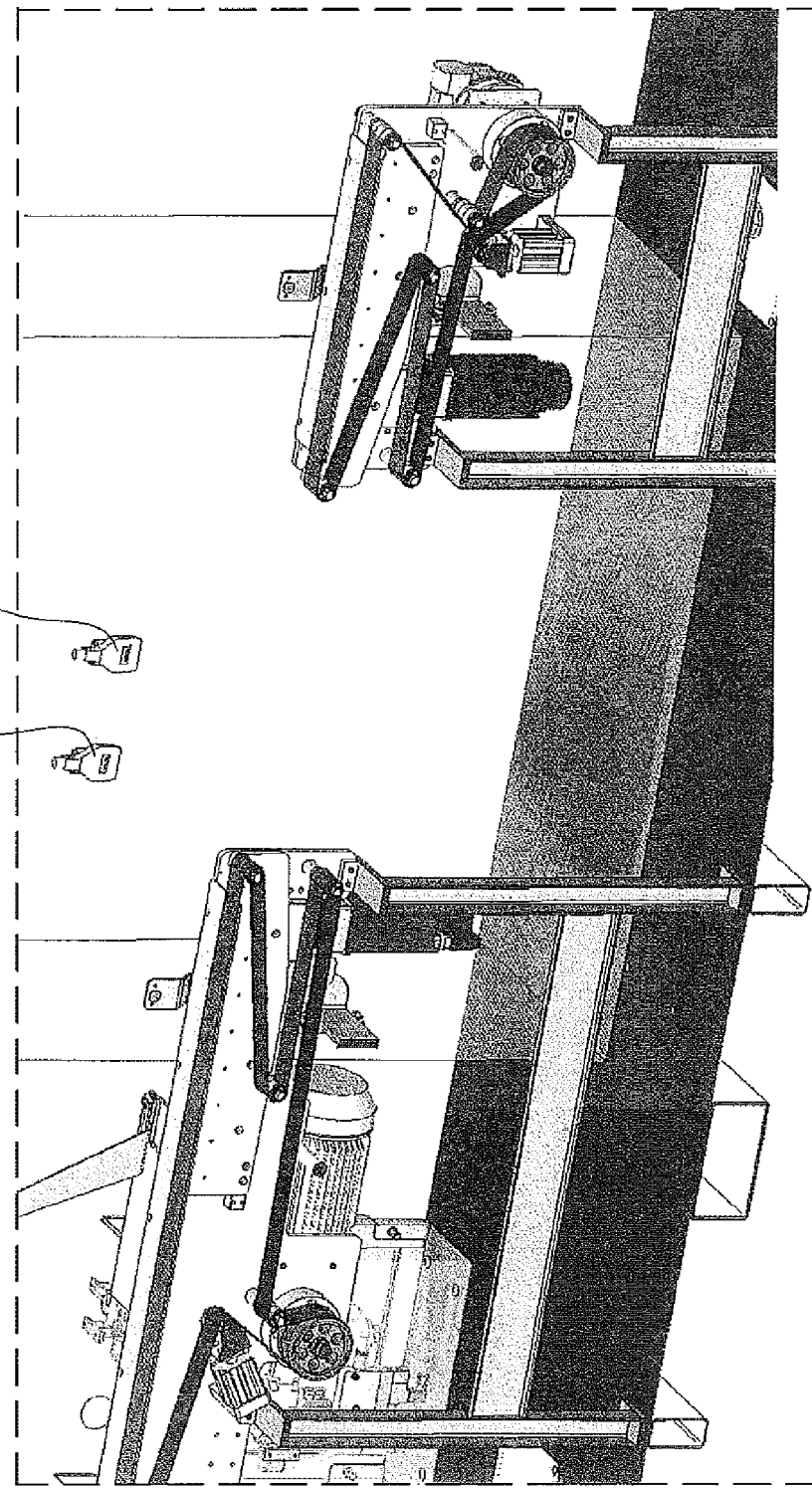

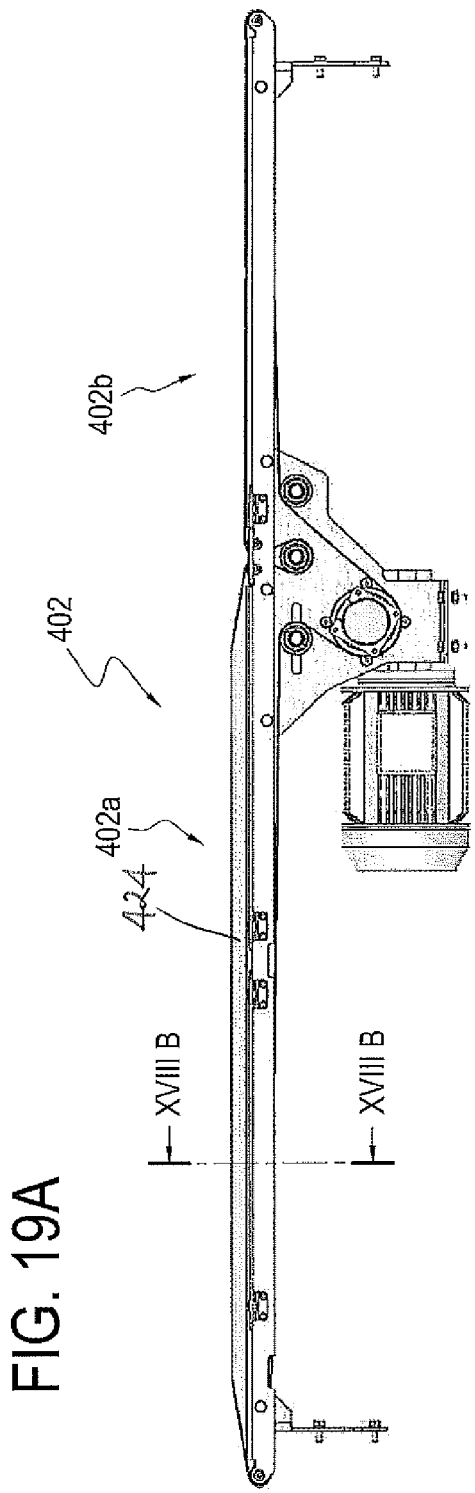

UNIT OR AN APPARATUS FOR CONTROLLING OR MANAGING PRODUCTS OR ROLLS

This application is divisional application of U.S. application Ser. No. 15/550,920 filed Aug. 14, 2017 which is a National Phase of International Application PCT/IB2016/051035 filed Feb. 25, 2016 which designated the U.S. and that International Application was published under PCT Article 21 (2) in English.

This application claims priority to Italian Application No. BO2015U000016 filed Feb. 27, 2015, Italian Application No. BO2015U000039 filed May 4, 2015 and Italian Application No. 202015000025907 filed Jun. 19, 2015, which applications are incorporated by reference herein.

TECHNICAL FIELD

This invention relates to a unit or apparatus for controlling or managing products or rolls.

BACKGROUND ART

Known in the prior art in the tissue paper industry are plants for the production of articles and corresponding packaging, such as rolls and towels of tissue paper, which are packed in corresponding packets, packs, bags, pallets or other.

Generally speaking, these prior art plants comprise at least one operating line including at least one upstream section for making the articles, in particular in the form of log saws for cutting rolls off respective elongate logs, and at least one respective packaging section, in particular for primary packaging, preferably in the form of a packing section where the articles or rolls are packed.

Prior art plants may also include one or more further packaging sections, in the form of a section for cartoning, or bagging, the packs and/or a section for palletizing the packs or cartons/bags.

Prior art plants also include conveying means by which the products are transported between one section of the plant and another, in particular between the means which make the articles and the respective packaging section and between one packaging section and another in the downstream part of the plant.

However, in plants of the above mentioned type in the tissue industry—but also in plants for making other types of products—, although the large quantities of articles made are of satisfactory quality, a certain number of defective end products are produced which are only occasionally removed, completely manually, by machine operators and which are unfortunately placed on the market and eventually reach end users.

Even today, therefore, prior art plants of this kind continue to produce defective products which do not measure up to consumer quality standards.

Moreover, in prior art plants of this kind, it is difficult to promptly determine the causes of defective products with any degree of certainty.

In short, prior art plants of this kind produce non-negligible quantities of defective products which machine operators find it difficult to pick out but which, on account of complaints and order losses, nevertheless cause production losses for the companies which use these production plants.

Furthermore, there is also in the industry a generally felt need for machinery and equipment which are relatively low in cost and/or which do not have excessive impact on normal production activities.

Yet another need felt by the industry is that for machinery and equipment that is easy for operators to install and/or use.

A further need felt by the industry is that for machinery and equipment which can operate at relatively high speeds and/or with particularly high levels of effectiveness and efficiency.

Moreover, the industry also feels the need for machinery and equipment which offer a particularly small footprint.

DISCLOSURE OF THE INVENTION

This invention therefore proposes a new solution as an alternative to the solutions known up to now and, more specifically, proposes to overcome one or more of the above mentioned drawbacks or problems and/or to meet one or more of the needs felt by the trade and which, in particular, may be inferred from the above.

It is accordingly provided a unit or apparatus for the control or management of products, in particular rolls, in particular in the form of products of the tissue industry, preferably of paper or other material such as fabric or non-woven fabric or other material, the articles being preferably in the form of rolls of toilet paper, kitchen paper or the like; the unit preferably being usable in a plant comprising at least one operating line including at least one upstream section for making the articles, in particular in the form of a log saw for cutting rolls off respective elongate logs, at least one respective packaging section, in particular for primary packaging, preferably in the form of a packing section where the articles or rolls are packed and preferably at least one or more further packaging sections, in particular in the form of at least one bagging section where the packs are placed in bags and/or one palletizing section where the packs or bags are placed on pallets; the plant comprising a conveying section, or means, by which the products are transported between one section of the plant and another, in particular between the means which make the articles and the respective packaging section downstream; the plant being provided with electronic process control means for controlling the functioning of the plant sections; the control and management unit preferably comprising respective means for conveying the products or rolls; characterized in that it comprises means for eliminating the respective product or roll, in particular a defective product or roll.

It is thus possible to prevent defective products or rolls produced in the corresponding plant from being packaged and sold and, undesirably, eventually reaching end consumers.

BRIEF DESCRIPTION OF THE DRAWINGS

This and other innovative aspects, or specific advantageous embodiments, are set out in the appended claims and its technical features are apparent from the detailed description which follows of a preferred, advantageous embodiment which must, however, be considered purely as a non-limiting example of the invention; the description being made with reference to the accompanying drawings, in which:

FIG. 6 is a schematic perspective view of a second preferred embodiment of the unit for the control or management of products;

FIGS. 14A and 14B are perspective views showing the roll elimination zone of the further preferred embodiment of the unit according to this invention;

FIGS. 19A to 19C are respective side, cross section (through the plane IXX of FIG. 19C), and perspective views showing the means for centring the products on the respective conveying line of the fourth preferred embodiment of the unit according to this invention;

DETAILED DESCRIPTION OF PREFERRED EMBODIMENTS OF THE INVENTION

Figure 1:
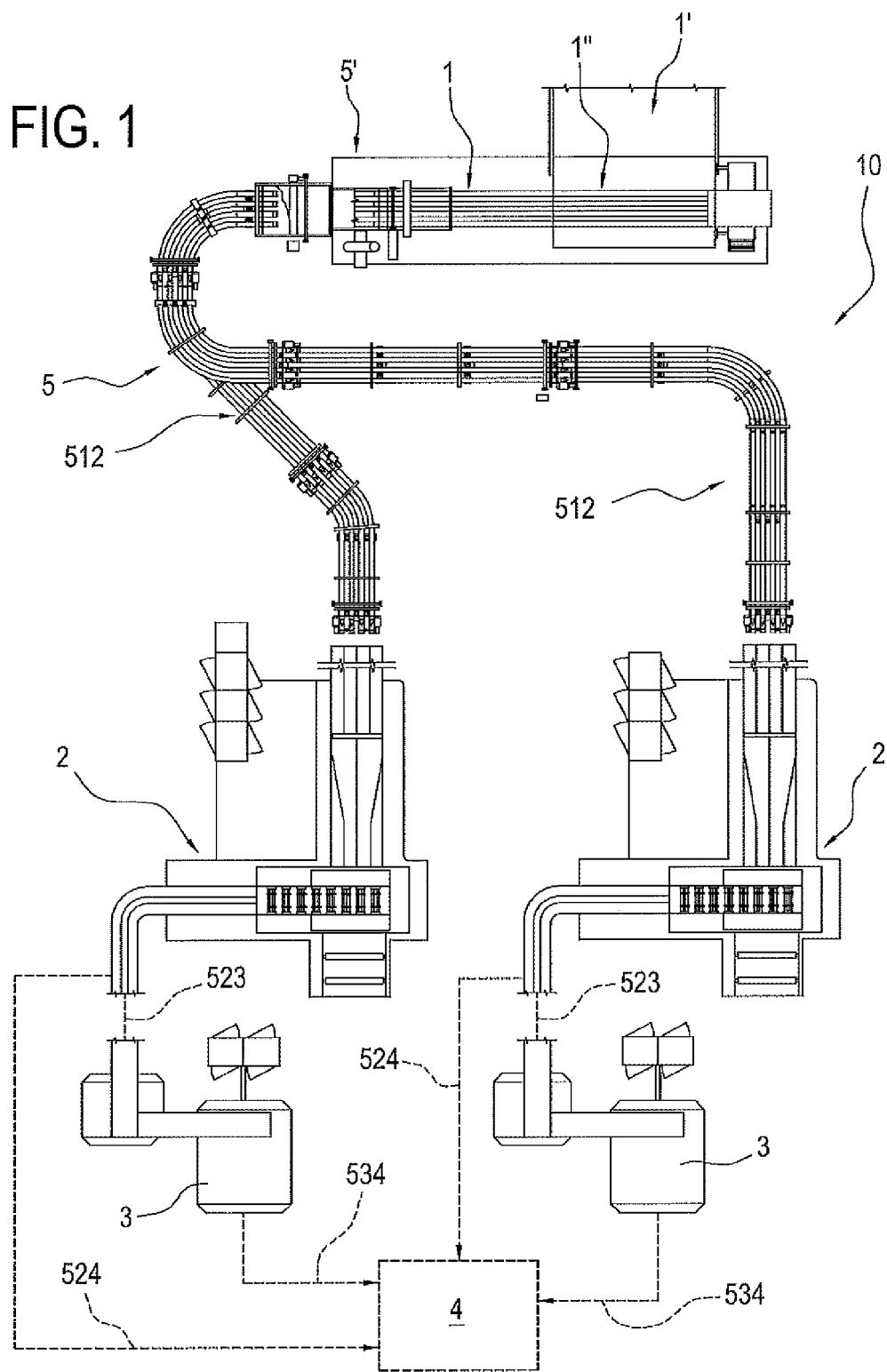
FIG. 1 shows a schematic plan view of a preferred embodiment of the plant of the tissue industry adapted to use a preferred embodiment of a unit for the control and management of products according to this invention.

FIG. 1 illustrates a preferred embodiment 10 of a processing plant, in particular for making respective products, where respective articles packed in respective packages are made.

Preferably, the articles are in the form of articles of the tissue industry, such as rolls, handkerchiefs, hand and face wipes, napkins or the like, made of paper material.

More specifically, the rolls are in the form of rolls of toilet paper and/or kitchen paper.

The packages are in turn preferably in the form of packets, packs, boxes, bags, pallets or other.

More specifically, the plant 10 comprises at least one operating line which includes at least one upstream section 1, for making the articles, in particular in the form of rolls, the upstream section being, in particular in the form of a log saw machine for cutting the rolls from a respective elongate log. As illustrated, the log saw machine comprises means 1' for making the log and means 1" for cutting the rolls from the log.

The plant 10 also comprises at least one packaging section 2, in particular for primary packaging, preferably in the form of a section for packing the articles or rolls, in particular in a respective film, preferably a plastic wrapping film.

More specifically, as illustrated, the example embodiment described herein comprises a first and a second primary packaging section 2, 2, fed by respective conveying sections, or lines, 5.

Downstream of the respective primary packaging section 2, the plant also comprises at least one or more further packaging sections 3 and/or 4.

More specifically, as illustrated, there are means or sections for bagging the packs, namely, a first and a second bagging section 3 downstream of the respective packing machines 2, and an end palletizing section 4 which receives the products through corresponding conveying lines from the respective bagging machine or directly from the respective packing machine 2.

As illustrated, the plant comprises a respective conveying section, or means 5, by which the products are transported between one section of the plant and another, in particular between the means 1 which make the articles and the respective packaging section 2 and/or between one packaging section and another downstream.

More specifically, as illustrated, the conveying means 5 comprise means 512 for conveying the products between the section which makes the articles 1 and the respective packing section 2 and which comprise a respective stage, or apparatus, 5' for directing the flows of articles feeding out of the machine which makes the articles 1 towards corresponding lines leading to the respective packing machines 2, 2.

Also, as illustrated, the conveying means 5 comprise respective conveying means 523 running between the corresponding packing section 2 and the respective bagging section 3, as well as conveying means 534 running between the respective bagging section and the palletizing section 4.

As illustrated, the use of conveying means 524 running between the respective packing section 2 and the palletizing section 4 is also contemplated.

As illustrated, the conveying means comprise a plurality of parallel conveying lines or belts for corresponding pluralities of articles and/or packages. More specifically, as illustrated, four parallel conveyor belt lines are used in the stretches 512 of the conveying means.

Figure 2:
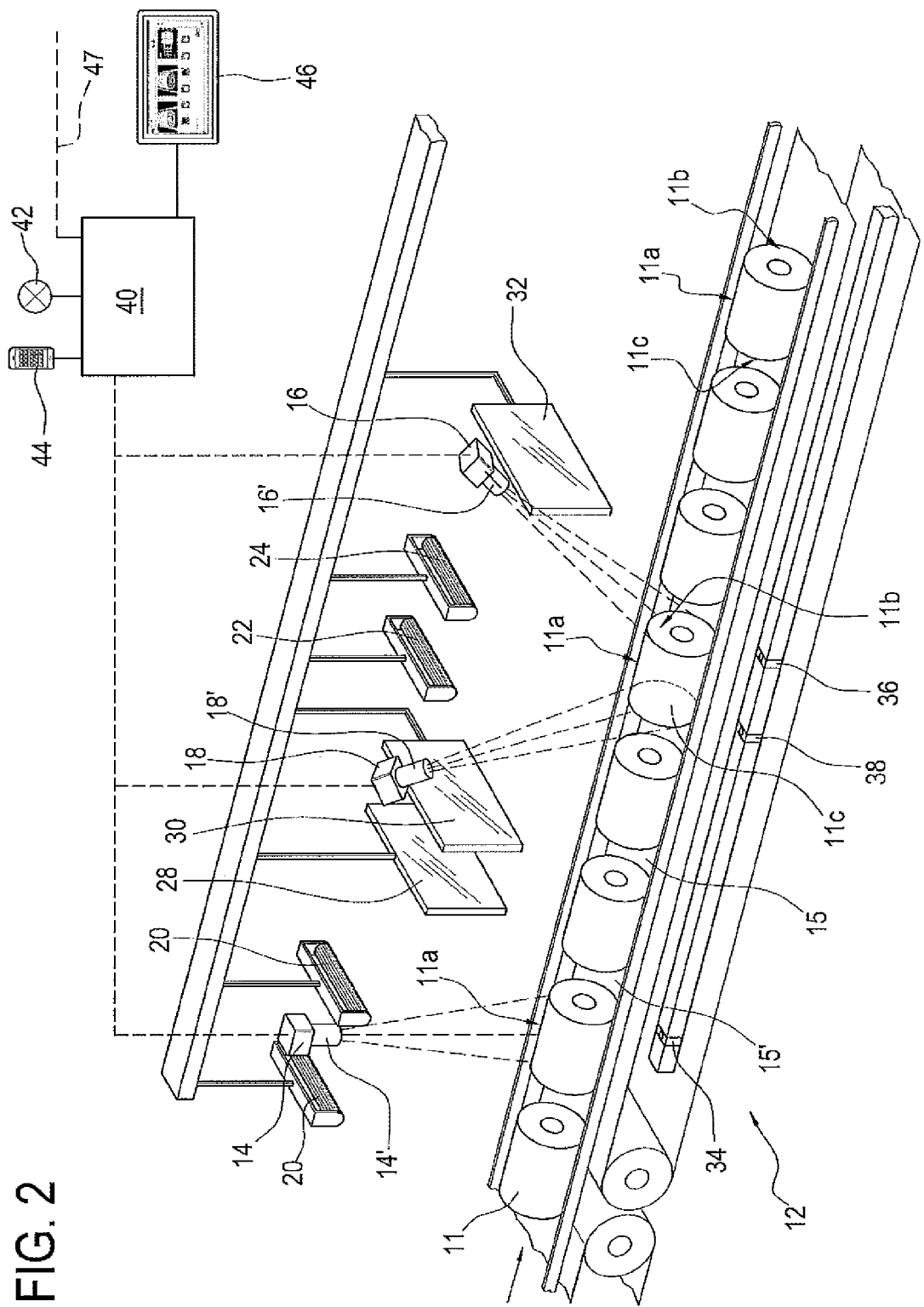
FIG. 2 shows a perspective view of a first preferred embodiment of a unit for the control and management of products and preferably for detecting defective products according to this invention and located along the respective product conveying line.

Advantageously, the plant of the invention comprises at least one unit 12, illustrated in FIG. 2, for the control or management of products, that is, for detecting products, in particular defective products, especially for detecting articles and/or packages, in particular defective articles and/or packages, preferably for detecting rolls, in particular defective rolls.

By way of example, the unit of the invention is adapted to work with rolls of different sizes, for example rolls whose diameter is preferably between 90 mm and 200 and whose length is preferably between 90 mm and 280 mm.

The unit of the invention is also adapted to work with rolls made of white or coloured paper or paper printed with respective logos, images, designs or decorations.

More specifically, the unit 12 for detecting defective products is advantageously situated at the conveying means of the plant, in particular at the conveying section 512 located between the section 1 which makes the articles, in particular the log saw which cuts off the rolls, and the respective packaging section 2, in particular defined by the corresponding packing machine.

Preferably, the unit of the invention is located at the outfeed of the log saw, or section for making the articles 1.

More specifically, the unit 12 for detecting defective products, might also be located at the respective conveying section 523, 524, downstream of the respective packaging section 2, and/or at the respective conveying section 534, downstream of the respective bagging section 3.

Advantageously, the unit 12 for detecting defective products, comprises means 14, 16, 18 for capturing at least one corresponding image, in particular a plurality of images, of the respective product.

More specifically, the unit 12 for detecting defective products thus advantageously comprises image capturing means embodied by camera means 14, 16, 18 adapted to capture one or more images of the respective product, even in the form of corresponding sequences of images.

More specifically, the camera means are in the form of one or more cameras known as "smart cameras", which comprise respective microprocessor means which allow controlling image capturing and which preliminarily process the captured images as a function of specific operating needs which will become clearer as this description continues.

Advantageously, therefore, the mode of detecting the product by the camera means 14, 16, 18 can be modified according to specific product image capturing requirements.

Advantageously, therefore, capturing means 14 are provided which are adapted to take snapshots of the product from above in order to obtain or capture at least one image of the top face or surface 11a of the respective product or roll.

It is thus possible to detect corresponding characteristics of the product.

More specifically, capturing images of the product from above allows inspecting the length, width and/or exterior aspect of the corresponding outside surface of the respective product, that is, also the condition or state of the respective end flap of the roll as will become clearer as this description continues.

Also advantageously provided are capturing means 16 which can take snapshots of the product from the front in order to capture at least one corresponding image of the front face 11b of the respective product or roll.

It is thus possible to detect corresponding characteristics of the product, in particular those which can be inferred from its front face.

Also advantageously provided are capturing means 18 which can take snapshots of the product from the back in order to capture at least one corresponding image of the rear face 11c of the respective product or roll.

It is thus possible to detect corresponding characteristics of the product, in particular those which can be inferred from its rear face.

More specifically, as illustrated in FIG. 2, the unit 12 advantageously comprises respective camera means which include a camera 14 located above the means 5 for conveying the product 11 to be detected.

More specifically, the camera 14 has a respective lens 14' which is directed, that is, whose optical axis is directed, perpendicularly or substantially perpendicularly, to the product supporting and transporting surface 15' of the corresponding conveying means 5.

That way, it is particularly easy to take snapshots of the top face of the product, in particular without interfering with the product conveyor, that is to say, without substantially disturbing normal plant operation.

Advantageously, as illustrated, the camera means comprise a corresponding camera and, in particular, a first and a second camera 16, 18, which are respectively located above the product conveying means and, in particular, whose respective lens, or the respective axis thereof, or the respective optical axis thereof, is inclined at a respective angle to the product supporting surface 15' of the conveying means 5.

That way, it is easy to take snapshots of the front and/or rear face of the product, in particular without interfering with the product conveyor, that is to say, without substantially disturbing normal plant operation.

More in detail, the camera means advantageously comprise a corresponding camera 16 whose respective lens 16' is inclined at a respective angle to the product supporting surface 15' of the conveying means 5, the lens 16' being directed in the direction opposite to the product feed direction.

That way, it is easy to take snapshots of the respective front face of the product without substantially disturbing normal plant operation.

Further, as illustrated, the camera means comprise a corresponding camera 18 whose respective lens 18' is inclined at a respective angle to the product supporting surface 15' of the conveying means 5, the lens 18' being directed in the same direction as the product feed direction.

That way, it is easy to take snapshots of the respective rear face of the product without substantially disturbing normal plant operation.

More specifically, as may be inferred from the drawings, the camera means comprise a corresponding camera 14, 16, 18, whose respective lens 14', 16', 18' is positioned at the transverse centre line of the product supporting surface 15' of the conveying means 5, and in particular, at the transverse centre line of the product 11 to be detected.

More specifically, the camera means 14, 16, 18 are advantageously positioned above the conveying means 5 at a distance from the product supporting surface 15' of the selfsame conveying means 5 such that they are higher up than the maximum height of the corresponding product to be detected as it moves along the conveying means 5, or such as to be higher up than the maximum height reachable by a plurality of product types or sizes which can be processed in the plant of the invention.

That means it is advantageously possible to avoid having to adjust the position of the camera means during changeovers.

More specifically, the camera means 14, 16, 18 advantageously have a respective depth of field, that is, a depth or length where the respective image is "in focus", that is to say, a clear image, and which is suitable for detecting a plurality of products of different sizes, in particular different heights and diameters, as they move forward along the conveying means 5. For example, the respective depth of field of the camera means 14, 16, 18 is suitable for taking snapshots of, or keeping in focus, rolls between 90 mm and 200 mm in diameter without carrying out any adjustments.

That way, it is not necessary to adjust the focus of the respective camera means when changing over to products of a different size.

Advantageously, the unit 12 for detecting defective products operates while the products 11 move along the respective conveying means 5, that is to say, while the products are moving forward or performing the respective feed movement.

In practice, the detection means—or camera means—14, 16, 18 operate while the products 11 advance on the respective conveying means 5, that is to say, they capture images of the products while the products are in motion.

In practice, the product or roll, in particular the defective product or roll, is thus eliminated in a particularly rapid manner and without substantially slowing plant operation or the product conveyor system.

More specifically, the unit 12 for detecting defective products operates with products moving forward at a speed of between 235 and 400 rolls per minute.

That way, any defective products can be detected without substantially disturbing normal plant operation and without causing production losses in the plant where the unit is installed.

More specifically, the perpendicular camera 14 is preferably a colour camera, whilst the inclined cameras 16 and 18 are preferably black and white cameras.

It will be understood, however, that the cameras, and corresponding illuminators which are described in more detail below, may be sensitive to electromagnetic radiation in one or more of the infrared, visible or ultraviolet fields.

Advantageously, also, the unit 12 for detecting defective products comprises respective means 20, 20, 22, 24 for lighting the product at the respective detection zone.

That way the product to be detected can be viewed specifically and optimally.

More specifically, the lighting means advantageously comprise a corresponding illuminator, in particular a first and a second illuminator, or lamp, 20, 20, at the respective camera 14 whose lens 14' is directed perpendicularly or substantially perpendicularly to the product supporting surface 15' of the conveying means 5.

That way, the top face of the product to be detected is viewed in optimum manner.

More specifically, the lighting means advantageously comprise a first and a second illuminator, or lamp, 20, 20, which are positioned along the longitudinal feed direction of the products upstream and downstream of the respective camera 14 whose lens 14' is directed perpendicularly or substantially perpendicularly to the product supporting surface 15' of the conveying means 5.

Advantageously, the lighting means comprise a corresponding illuminator or lamp, 22, 24, at the respective camera 16, 18 whose lens 16', 18' is inclined to the product supporting surface 15' of the conveying means 5.

That way, the respective transverse, front or rear face of the product to be detected is viewed in optimum manner.

More specifically, as illustrated, the lighting means comprise a corresponding illuminator or lamp, 22, 24, which is advantageously directed towards the respective camera 16, 18 whose lens 16', 18' is inclined to the product supporting surface 15' of the conveying means 5.

Advantageously, as illustrated, the lighting means comprise a corresponding illuminator or lamp, 22, 24, which is positioned along the longitudinal feed direction of the products upstream and downstream of the respective camera at the respective camera 16, 18 whose lens 16', 18' is inclined to the product supporting surface 15' of the conveying means 5.

As illustrated, the lighting means advantageously comprise at least one corresponding illuminator, or lamp, in particular a first and a second illuminator 22, 24, the respective illuminator being positioned along the longitudinal feed direction of the products between the respective cameras 16 and 18 whose respective lenses 16', 18' are inclined to the product supporting surface 15' of the conveying means 5.

Advantageously, the lighting means comprise a corresponding illuminator or lamp, 22, 24, which is located at substantially the same height as the respective camera 16, 18 whose lens 16', 18' is inclined to the product supporting surface 15' of the conveying means 5.

Advantageously, the lighting means then comprise a corresponding elongate illuminator, or elongate lamp, 20, 20, 22, 24 which extends transversely to the longitudinal direction of product feed and positioned centrally relative to the centre line of the conveying means 5, or rather, of the product supporting surface 15' of the conveying means 5.

Particularly advantageously, the lighting means 20, 20, 22, 24 are controlled in such a way as to view or illuminate the product variably, in particular as a function of the specific image to be captured, preferably as a function of the detail of the product to be specifically detected and inspected.

That way, the product is viewed in the optimum manner, in particular allowing its specific, potentially faulty characteristic to be detected.

Also imaginable is the use of distinct illuminators to light different parts of the product to allow taking images or sequences of images of corresponding details of the product.

Advantageously, the unit 12 for detecting defective products comprises means 28, 30, 32 for reflecting the radiation used to light the product, in particular the radiation emitted by the illuminator means 20, 20, 22, 24.

That way, the product to be detected, or rather, the specific zone of the product to be detected, can be viewed in the optimum manner.

More specifically, the means for reflecting the radiation used to light the product advantageously comprise a respective reflecting screen 28 at the camera 14 whose lens 14' is directed perpendicularly or substantially perpendicularly to the product supporting surface 15' of the conveying means 5, the reflecting screen 28 being, in particular, located downstream of the camera 14 along the longitudinal direction of product feed.

As illustrated, the means for reflecting the radiation used to light the product advantageously also comprise a reflecting screen, in particular first and second reflecting screens 30, 32, located, respectively, at the cameras 16, 18 whose lenses 16', 18' are inclined to the product supporting surface 15' of the conveying means 5.

In particular, as illustrated, the respective screen 30 or 32 is located, respectively, upstream or downstream, of the respective camera 16 or 18 along the longitudinal direction of product feed.

More specifically, as illustrated, the respective reflecting screen 30 or 32 is provided on the longitudinal side of the respective camera 16 or 18 opposite the side where the corresponding lighting means 22, 24 are located, being situated, in particular, just behind the respective camera means 16, 18.

Advantageously, the unit 12 for detecting defective products comprises means 34, 36, 38 for activating product detection by corresponding camera means 14, 16, 18.

That way, product detection by the camera means can be activated conveniently and promptly.

Advantageously, the unit 12 for detecting defective products comprises means 34, 36, 38 for activating detection of the respective product by the means 14, 16, 18 for capturing at least one corresponding image of the respective product, in particular by the corresponding camera means 14, 16, 18.

That way, product detection is advantageously activated at exactly the right time and only when strictly necessary.

More specifically, the means for activating product detection comprise sensor means for detecting the presence of the product at the respective detection zone and being, in particular, in the form of photocell means 34, 36, 38.

More specifically, advantageously, the means 34, 36, 38 for activating product detection emit a corresponding signal for activating detection when the product reaches a defined detection zone or when the product leaves a defined detection zone, that is to say, when it covers or uncovers a respective photocell located at the respective detection zone.

More specifically, the means 34, 36, 38 for activating detection are located at the conveying means 5.

More specifically, means 34 are provided for activating detection by the camera 14 whose lens 14' is directed perpendicularly or substantially perpendicularly to the product supporting surface 15' of the conveying means 5 and which are situated at the camera 14 itself and emit a corresponding activation signal when a product reaches the activation means 34 themselves, in particular, when the product is substantially centred longitudinally relative to the camera means 14.

Also provided are means 36 for activating detection by the respective camera 16 whose lens 16' is inclined to the product supporting surface 15' of the conveying means 5, these activating means 36 being situated upstream of the camera 16 itself at the zone of detecting the corresponding transverse face of the product and emitting a corresponding signal for activating the camera 16 when the product reaches the activation means 36 themselves.

Also provided are means 38 for activating detection by the respective camera 18 whose lens 18' is inclined to the product supporting surface 15' of the conveying means 5, these activating means 38 being situated downstream of the camera 18 itself at the zone of detecting the corresponding transverse face of the product and emitting a corresponding signal for activating the camera 18 when the product uncovers, or moves away from, the activation means 38 themselves.

Advantageously, at the unit 12 for detecting defective products, in particular at the means 14, 16, 18 for capturing at least one corresponding image of the respective product, the products are spaced apart along their longitudinal feed direction preferably by a spacing such as to allow capturing a corresponding transverse image, preferably complete, of the respective front and/or rear face of the product.

Advantageously, although not specifically illustrated in the accompanying drawings, the plant of the invention may comprise, upstream of the product detection unit 12, corresponding means for spacing the products being conveyed.

That way, it is possible to detect the product in optimum manner, and in particular to detect the front and rear transverse surfaces of the product.

More specifically, the longitudinal spacing between the products is a function of the dimensions or size of the respective product or roll.

For example, for rolls 110 mm in diameter, the spacing between two consecutive rolls may be between 75 mm and 85 mm.

Advantageously, the unit 12 for detecting defective products comprises electronic processing means 40, in particular in the form of an industrial PC provided with corresponding program means or software means.

More specifically, advantageously, the electronic processing means 40 receive data corresponding to at least one image of the respective product from the means for capturing at least one corresponding image of the product, in particular from the camera means 14, 16, 18.

The electronic processing means 40 then process the image and determine whether the product has any defect or defects.

Advantageously, the electronic processing means 40 process the image and determine at least one corresponding parameter representing a particular product characteristic to be assessed.

The electronic processing means 40 then determine whether the product is defective or acceptable by assessing whether the parameter representing a particular characteristic of the product falls outside or inside a defined tolerance range around a predetermined reference value.

The predetermined reference value is determined by processing at least one image of at least one corresponding product whose respective characteristic is optimal or, in any case, compliant with specifications.

Advantageously, the tolerance value around the respective reference value can be selected or set at will, in particular by the operator in charge, for example using an input keyboard forming part of the electronic processing means 40.

For different product characteristics, the electronic processing means 40 might also determine the level of product defectiveness or acceptability on a predetermined scale of values of the parameter representing a particular characteristic of the product.

The level on the predetermined reference scale is differentiated or classified based on a corresponding predetermined threshold value.

More specifically, the reference scale might have three different levels, respectively defining a product which is without defects, or substantially without defects, a product which is defective but acceptable and a product which is defective and unacceptable. There might also be a fourth reference level to indicate a severely defective product.

The electronic processing means 40 are also adapted to determine whether the product must be considered defective and non-conforming, or conformant and acceptable by combining together the parameters or scores obtained from the detection of different product defects.

In practice, the parameters or scores obtained from the detection of different product defects are suitably weighted and combined to give a total value or score.

In a preferred embodiment, the total defect score or value is conveniently compared with a predetermined reference value in order to determine whether the product is non-conforming and, for example, must be rejected, or is conformant and, for example, must not be rejected.

More specifically, the "weighting", that is, the value by which the parameter or score of the respective defect is weighted might be greater, i.e. higher, for defects considered particularly serious, such as, for example, dirt on the transverse surface resulting from cutting the roll, or smaller, i.e. lower, for defects considered less serious such as, for example, embossing which is not centred on the outside surface of the roll.

Figure 3:
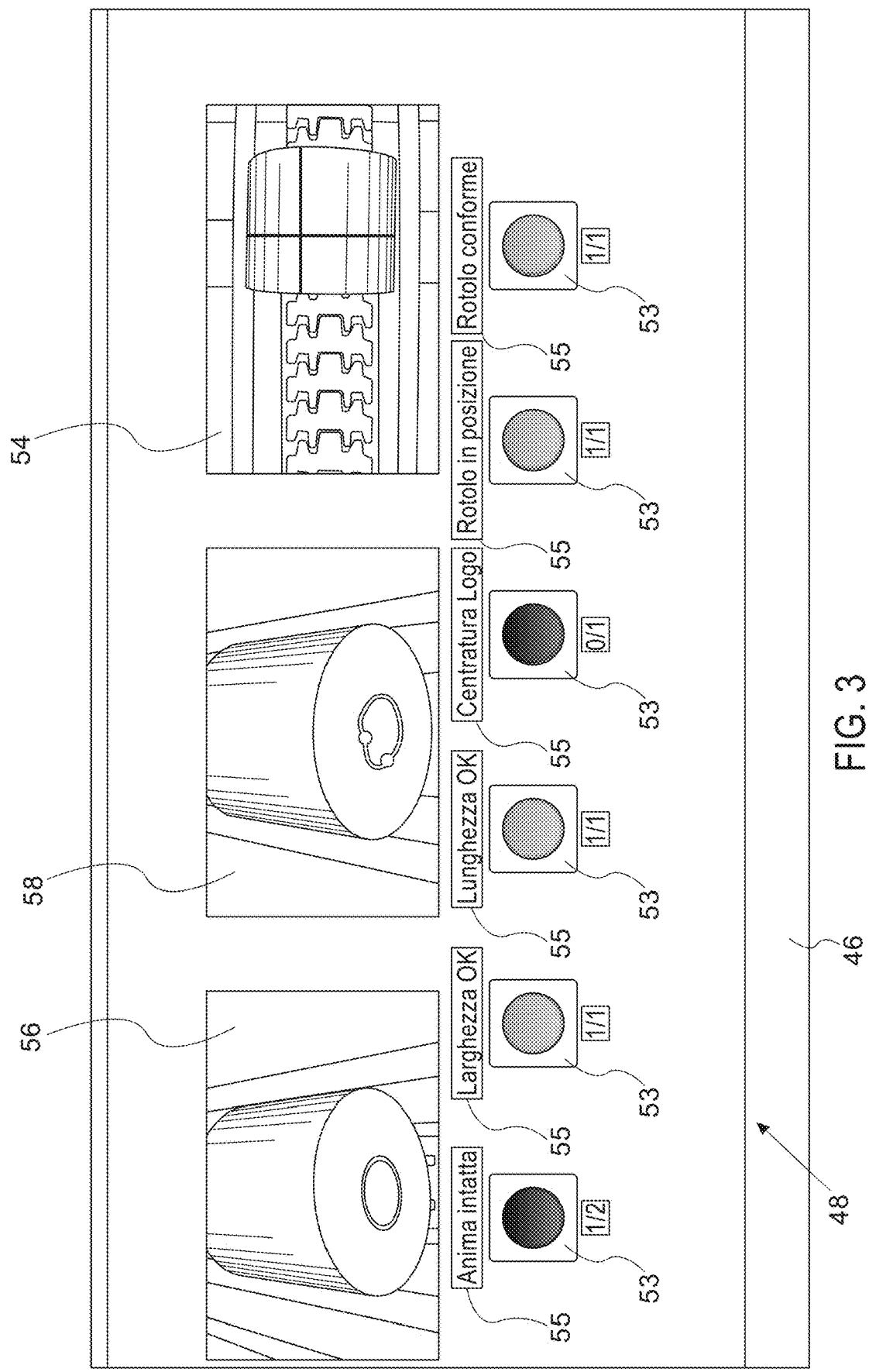
FIG. 3 shows a screenshot of the products being processed.

Advantageously, as may be inferred from FIGS. 2 and 3, the electronic processing means 40 trigger an operator alert procedure if they determine that the respective product is non-conforming.

More specifically, the alert procedure entails issuing a signal, preferably a light signal by means of an alarm lamp 42 at the detection unit 12, and/or a corresponding sound signal.

Advantageously, the electronic processing means 40 also send a corresponding message, in particular, an alarm or detected defect message, to the telephone, in particular, the mobile phone 44, or to another terminal device, in the operator's possession.

More specifically, such a message might be sent to the operator only on reaching a predetermined, convenient defectiveness threshold or level, which might be selectively settable, if necessary.

The electronic processing means 40 also trigger a corresponding operator alert procedure through corresponding display means, in particular through the display means 46 of the unit 12 for detecting the defective products.

As may be inferred in particular from FIG. 3, the electronic processing means 40 advantageously cause to be displayed on the respective display means, in particular on the display means 46 of the unit 12 for detecting the defective products, a graphical interface or screen 48, which comprises at least one field 54, 56, 58 showing the respective product image captured by the image capturing means, and more specifically, by the camera means 14, 16, 18.

In practice, advantageously, as shown in FIG. 3, the electronic processing means 40 display on the respective display means, in particular on the display means 46 of the unit 12 for detecting the defective products, a respective graphical interface or screen 48, which comprises a field 54 showing a respective image of the product or roll captured by the camera 14 whose lens 14' is directed perpendicularly or substantially perpendicularly.

Also, advantageously, as shown in FIG. 3, the electronic processing means 40 display on the respective display means, in particular on the display means 46 of the unit 12 for detecting the defective products, a respective graphical interface or screen 48, which comprises a field 56 showing a respective image of the product or roll captured by the camera 16 whose lens 16' is inclined and which captures an image of the front face of the product, and a field 58 showing a respective image of the product or roll captured by the camera 18 whose lens 18' is inclined and which captures an image of the rear face of the same product.

Further advantageously, the electronic processing means 40 display on the respective display means, in particular on the display means 46 of the unit 12 for detecting the defective products, a respective graphical interface or screen 48, which comprises an information field 51 which indicates whether the product is defective or conformant.

Further advantageously, the electronic processing means 40 display on the respective display means, in particular on the display means 46 of the unit 12 for detecting the defective products, a respective graphical interface or screen 48, which comprises one or more information fields 53 which indicate whether a specific characteristic of the product is defective or conformant.

As illustrated, the respective information field 51, 53 may advantageously be of the traffic light type, or of the varying colour type, from green to red, when the product or the specific characteristic thereof is conformant or non-conforming, i.e. defective.

Figure 4:
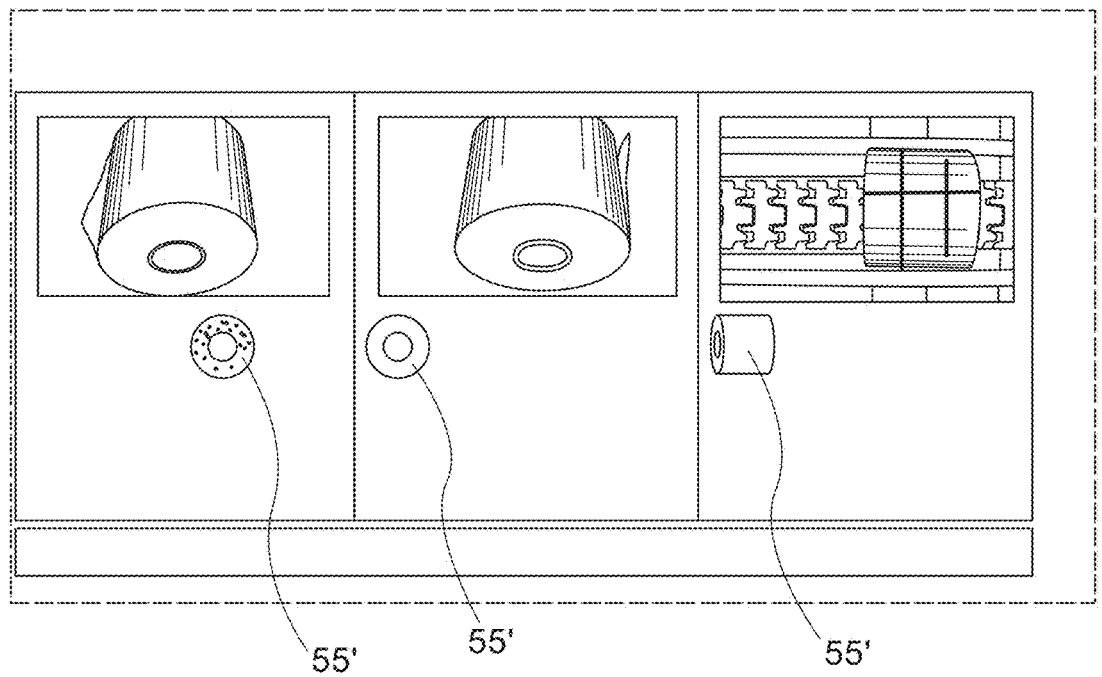
FIG. 4 shows a screenshot of the products being processed, alternative to the screenshot shown in FIG. 3.

Also, as illustrated, the electronic processing means 40 advantageously display at the respective information field 51, 53 a text 55, or possibly a drawing 55' (as shown in FIG. 4), which indicates or highlights the specific aspect or defect or product characteristic the respective information field 51, 53 refers to.

More in detail, the electronic processing means 40 advantageously determine the length and/or the width of the respective product or roll, determining it in particular through an image transmitted by the camera 14 whose lens 14' is directed perpendicularly or substantially perpendicularly, and thus determine whether the length and/or width is non-conforming, i.e. defective, or conformant, i.e. exact.

More specifically, the processing means 40 determine whether the length and/or the width of the respective product or roll falls within a certain tolerance interval, in particular a respective preset value for the specific size of product or roll detected. An example of a roll whose length is non-conforming, as detected by the present detection unit 12 and displayed on the respective display means 46, is shown in FIG. 5C.

Advantageously, the electronic processing means 40 determine the state of the outside surface of the product or roll, determining in particular the value of a corresponding parameter, and more specifically, determining it through an image transmitted by the camera 14 whose lens 14' is directed perpendicularly or substantially perpendicularly, and thus determine whether the outside surface is non-conforming, i.e. defective, or conformant. An example of a roll whose outside surface is non-conforming, as detected by the present detection unit 12 and displayed on the respective display means 46, is shown in FIG. 5F.

Advantageously, the electronic processing means 40 determine the position of the product or roll, determining in particular the value of a corresponding parameter, and more specifically, determining it through an image transmitted by the camera 14 whose lens 14' is directed perpendicularly or substantially perpendicularly, and thus determine whether the position is defective, i.e. incorrect, or conformant, i.e. correct. More specifically, a roll in an incorrect position might be a roll whose axis is rotated by 90° and whose respective transverse face is resting on the supporting surface 15' of the conveyor 5. An example of a roll whose position is non-conforming or incorrect, as detected by the present detection unit 12 and displayed on the respective display means 46, is shown in FIG. 5E.

Advantageously, the electronic processing means 40 determine whether the core of the product or roll is misshapen, determining in particular the value of a corresponding parameter, and more specifically, determining it through an image transmitted by the camera 16, 18 whose lens 16', 18' is inclined, and thus determine whether the core is non-conforming, i.e. defective, or conformant. More specifically, the level on a predetermined graduated scale the respective parameter falls into is determined, the predetermined graduated scale being specific to the respective size of product or roll detected. An example of a roll having a misshapen, non-conforming core, as detected by the present detection unit 12 and as displayed on the respective display means 46, is shown in FIG. 5B.

Advantageously, the electronic processing means 40 determine whether the respective transverse face of the product or roll is dirty, determining in particular the value of a corresponding parameter, and more specifically, determining it through an image transmitted by the camera 16, 18 whose lens 16', 18' is inclined, and thus determine whether the transverse face is defective, i.e. dirty, or conformant, i.e.

clean or slightly dirty. More specifically, the level on a predetermined graduated scale the respective parameter falls into is determined. An example of a roll having a dirty, non-conforming transverse face, as detected by the present detection unit 12 and as displayed on the respective display means 46, is shown in FIG. 5G.

Advantageously, the electronic processing means 40 determine whether the logo or the printed text, design or decoration on the outside surface of the product or roll is correctly positioned or centred, determining in particular the value of a corresponding parameter, and more specifically, determining it through an image transmitted by the respective camera 16, 18 whose lens 16', 18' is inclined, and thus determine whether the centring is non-conforming, i.e. defective, or conformant. More specifically, the processing means determine whether the centring of the logo falls within a certain tolerance interval. An example of a roll where the logo on the outside surface of the product or roll is not correctly positioned or centred, as detected by the present detection unit 12 and as displayed on the respective display means 46, is shown in FIG. 5D.

Also, advantageously, the electronic processing means 40 determine whether the printing and embossing on the outside surface of the product are centred.

Advantageously, the electronic processing means 40 also determine whether the winding or rewinding of the product or roll is irregular.

Advantageously, the electronic processing means 40 also determine whether the core of the product or roll is missing.

Advantageously, the electronic processing means 40 also determine whether the end flap of the product or roll is detached or excessively long. An example of a roll having a non-conforming end flap, as detected by the present detection unit 12 and as displayed on the respective display means 46, is shown in FIG. 5H.

Figure 5A:
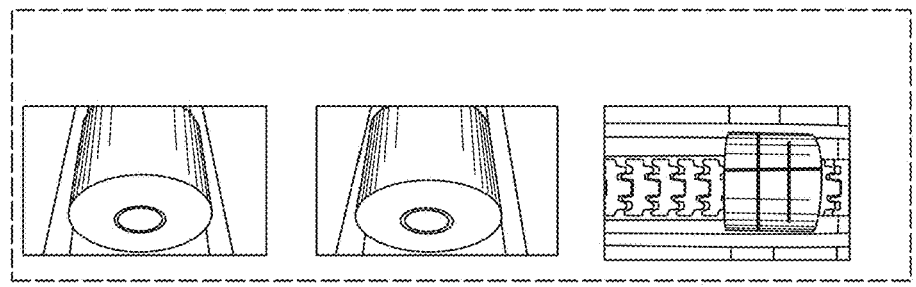
FIGS. 5A to 5H show different configurations of defective products as detected and displayed by the unit of the invention.
Figure 5B:
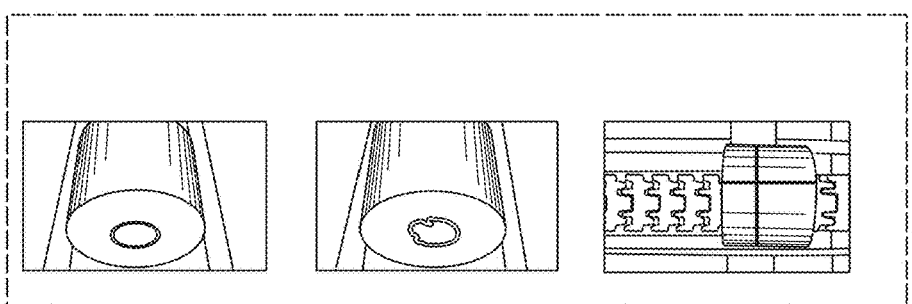
Figure 5C:
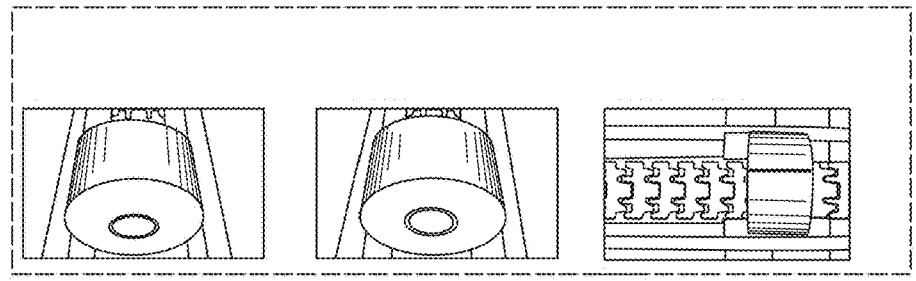
Figure 5D:
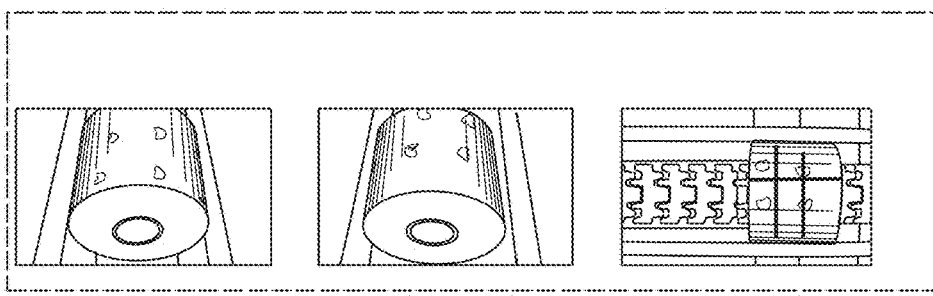
Figure 5E:
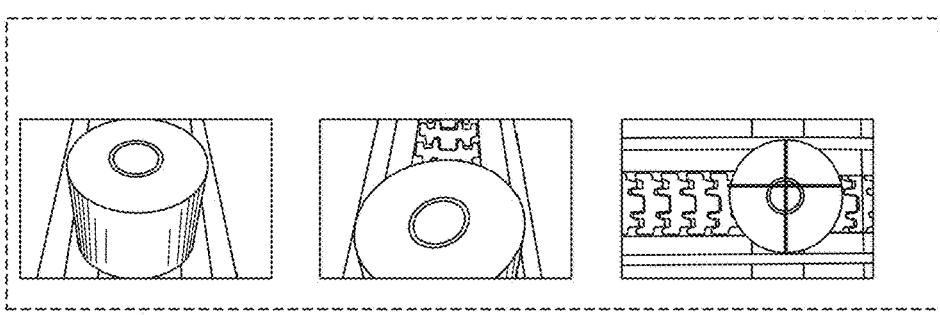
Figure 5F:
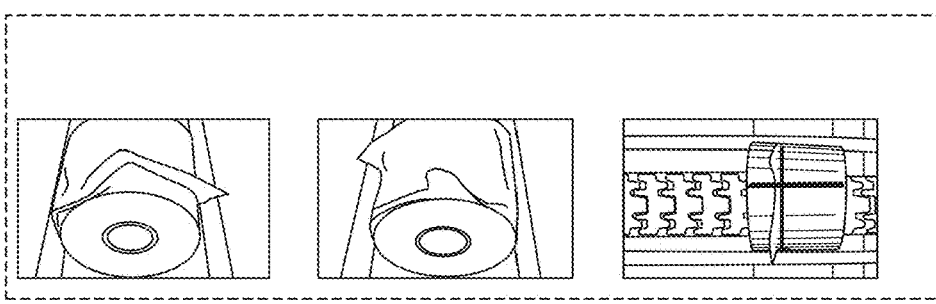
Figure 5G:
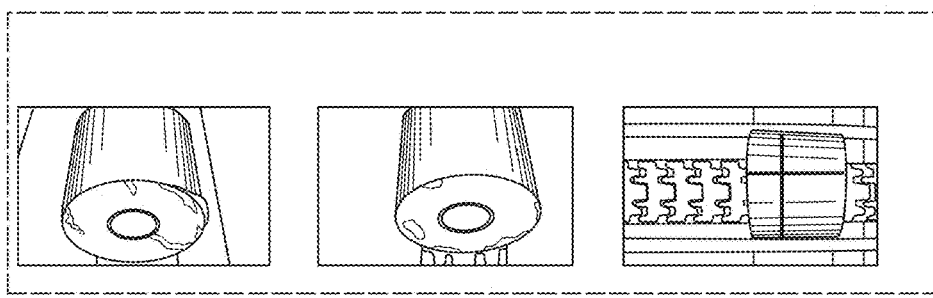
Figure 5H:
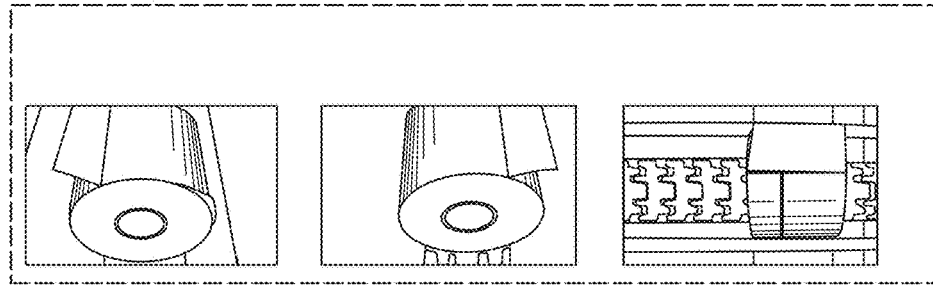

An example of a perfectly conformant roll, as detected by the present detection unit 12 and as displayed on the respective display means 46, is shown in particular in FIG. 5A.

Advantageously, the electronic processing means 40 also determine whether the transverse end face of the product or roll after being cut off is oblique.

Advantageously, the electronic processing means 40 provide defect tracking means used, in particular, for statistical purposes.

More specifically, the tracking means are advantageously adapted to count the number of rolls inspected and provide a total figure of production defectiveness, as well as the percentage of each single defect.

More specifically, the tracking means are, advantageously, adapted to indicate the type of rolls, the specific production session and the production batch. This data is conveniently stored with, or correlated to, the defects identified.

More specifically, the tracking means advantageously store the images of the defective products and associate them with the respective production data.

Advantageously, the images of non-defective products can also be taken and sampled, for example for purposes of statistical comparison with the defective products.

To do this, the defect tracking means might also be in the form of file folders, each containing image files of products having a respective defect, accompanied by images of non-defective products and/or a respective table or the like showing, for each defective product detected, the date, time and type of defect detected.

Advantageously, the predetermined reference or threshold values of the graduated scale differ according to the type and/or size of the product to be checked.

Advantageously, the predetermined reference or threshold values of the graduated scale are stored in a respective memory, in particular of the electronic processing means 40 of the unit 12 for detecting defective products and can preferably be called up manually by the operator or set automatically when the corresponding product type and/or size is processed.

Advantageously, also, the electronic processing means 40 are connected, at 47, to the plant control and/or management means.

Advantageously, the plant of the invention includes means for eliminating the defects detected and which might be in the form of means which directly correct, or simply indicate, the cause, upstream, which led to the production of a defective product.

More specifically, the means for eliminating the defects are in the form of means which, after the defects have been detected, send a corresponding signal to the control means of the device of the process machine, or operating section, situated upstream, so that the process in which the defect is produced can be corrected.

Further, the means for eliminating the defects might also be in the form of means for expelling the non-conforming products.

More specifically, the invention might contemplate the provision of a lateral expulsion unit, not illustrated in detail in the accompanying drawings and, for example electro-pneumatically driven, to expel non-conforming rolls, in conjunction with conveyor belt means and provided with respective control systems.

Figure 7:
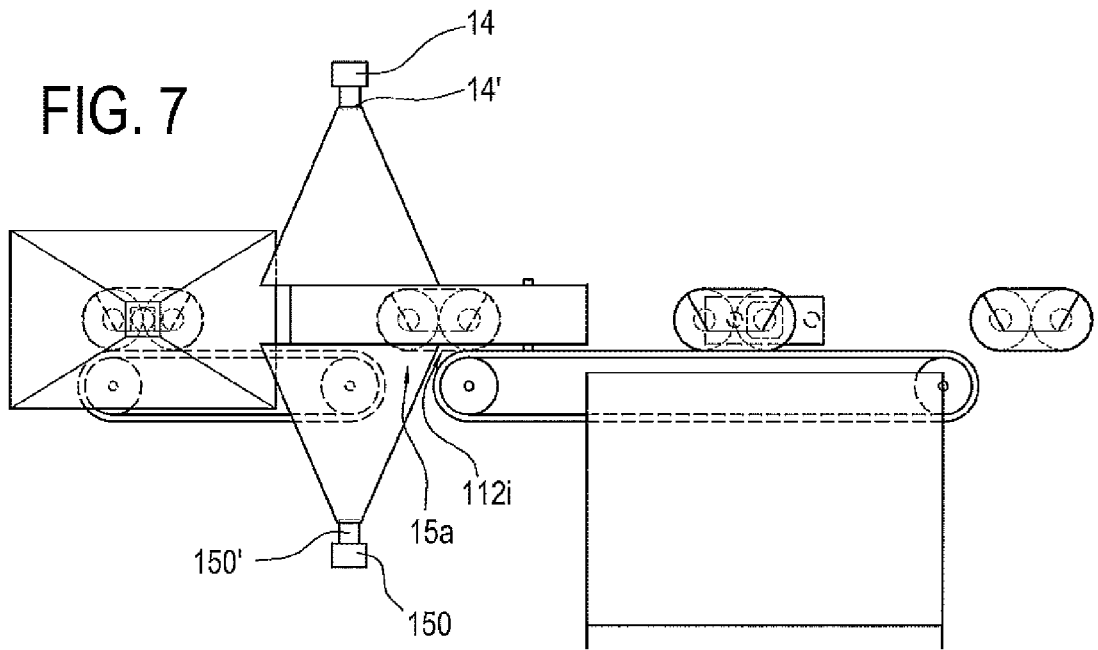
FIG. 7 is a side view of the second preferred embodiment of the unit according to the invention.
Figure 8:
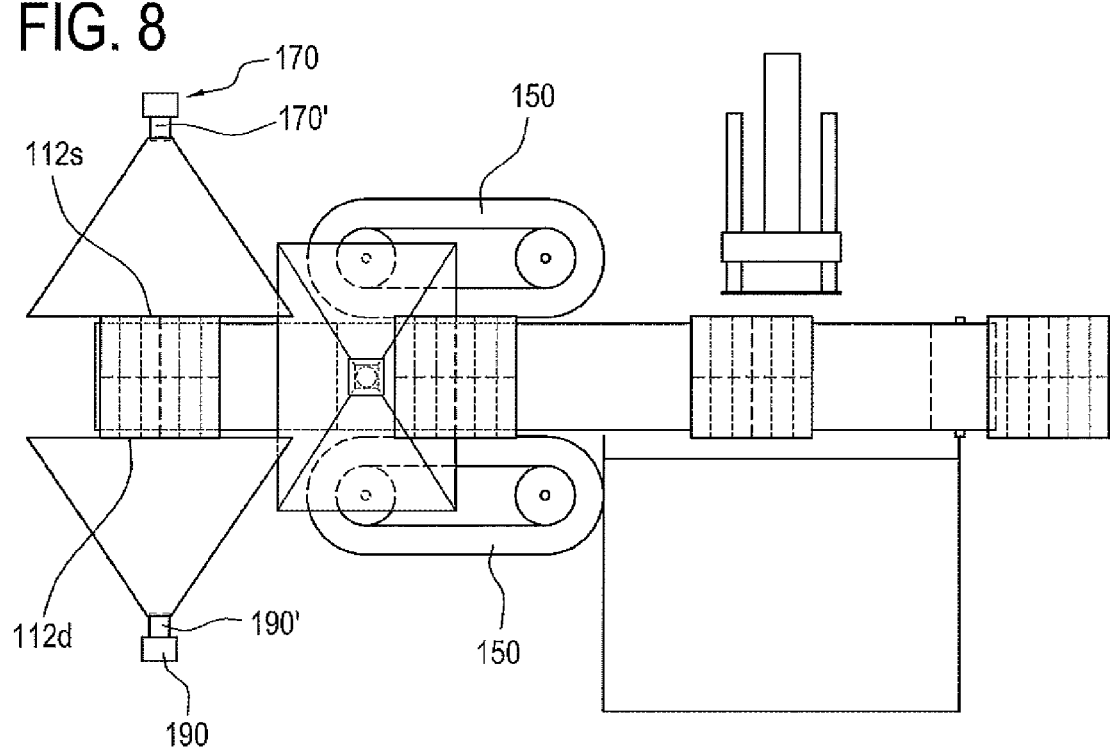
FIG. 8 is a schematic top plan view of the second preferred embodiment of the unit according to this invention.

FIGS. 6 to 8 illustrate a second preferred embodiment 120 of the unit for the control or management of products, that is, for detecting products, in particular defective products and which is particularly suitable for detecting corresponding packs of articles, in particular packs of rolls 112.

Figure 9:
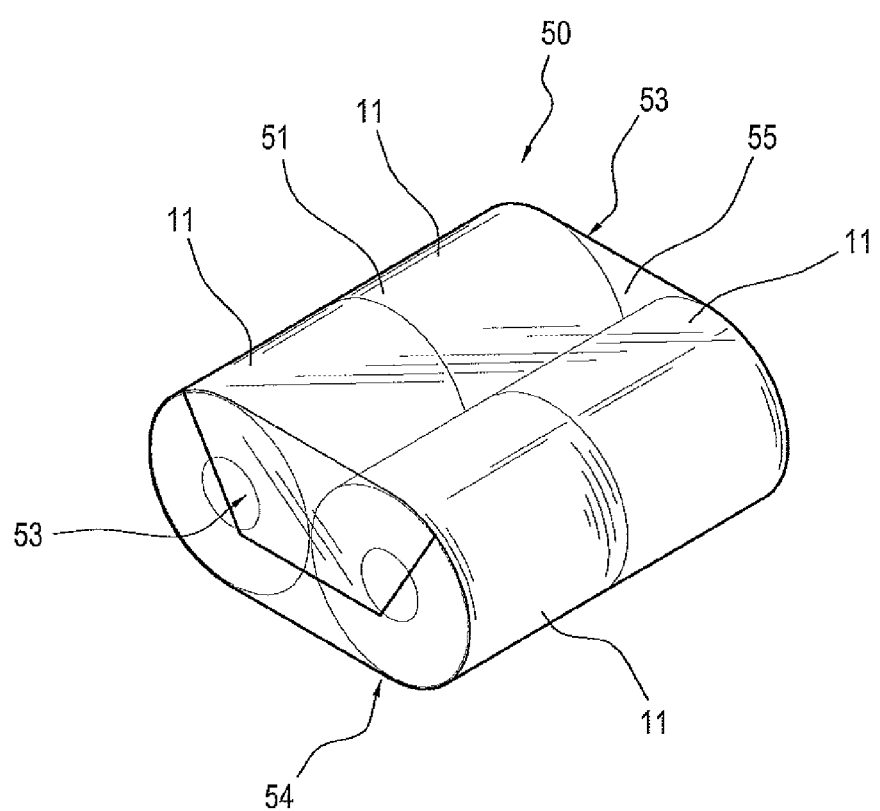
FIG. 9 shows a perspective view of a type of pack which can be processed by this plant.
Figure 10:
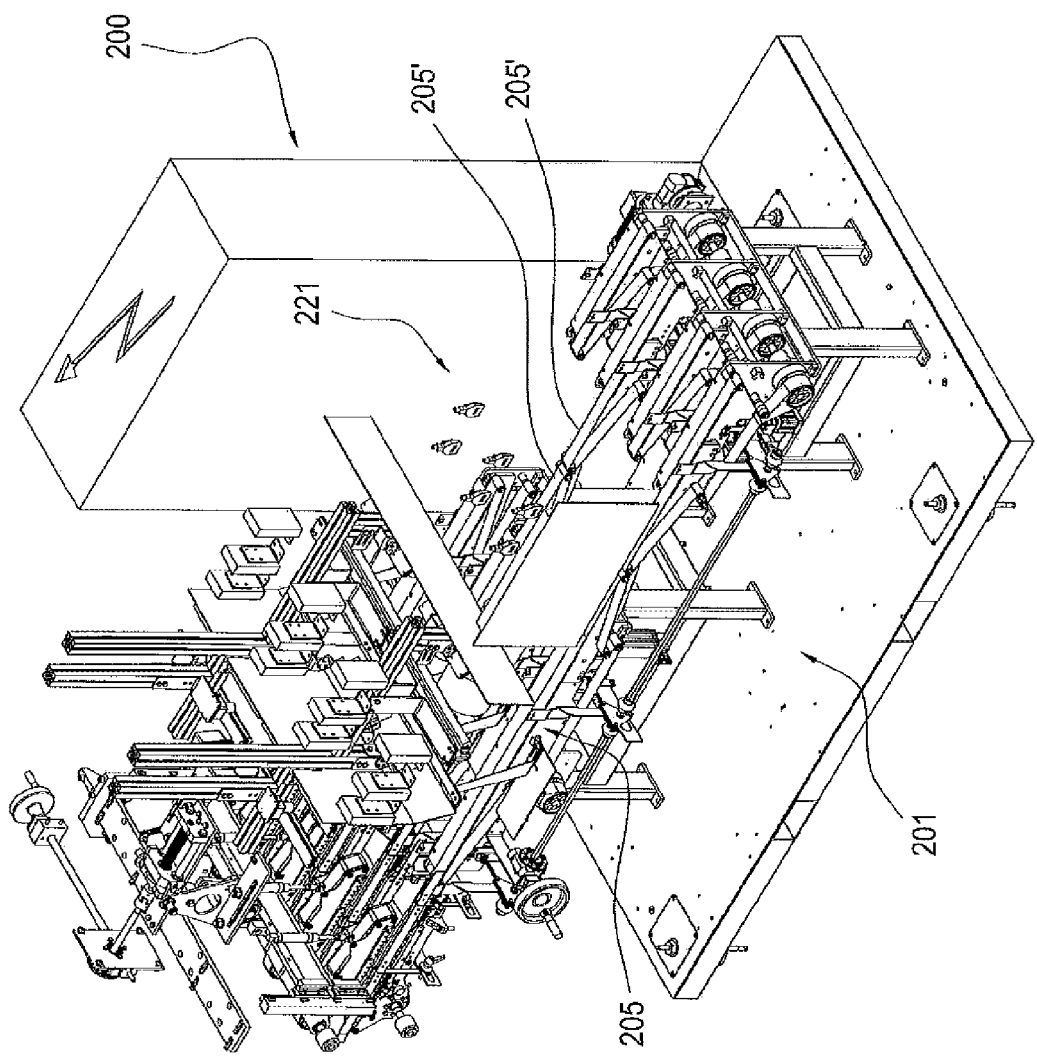
FIG. 10 shows a schematic perspective view of a further, third preferred embodiment of a unit according to this invention, for the control and management of products.
Figure 11:
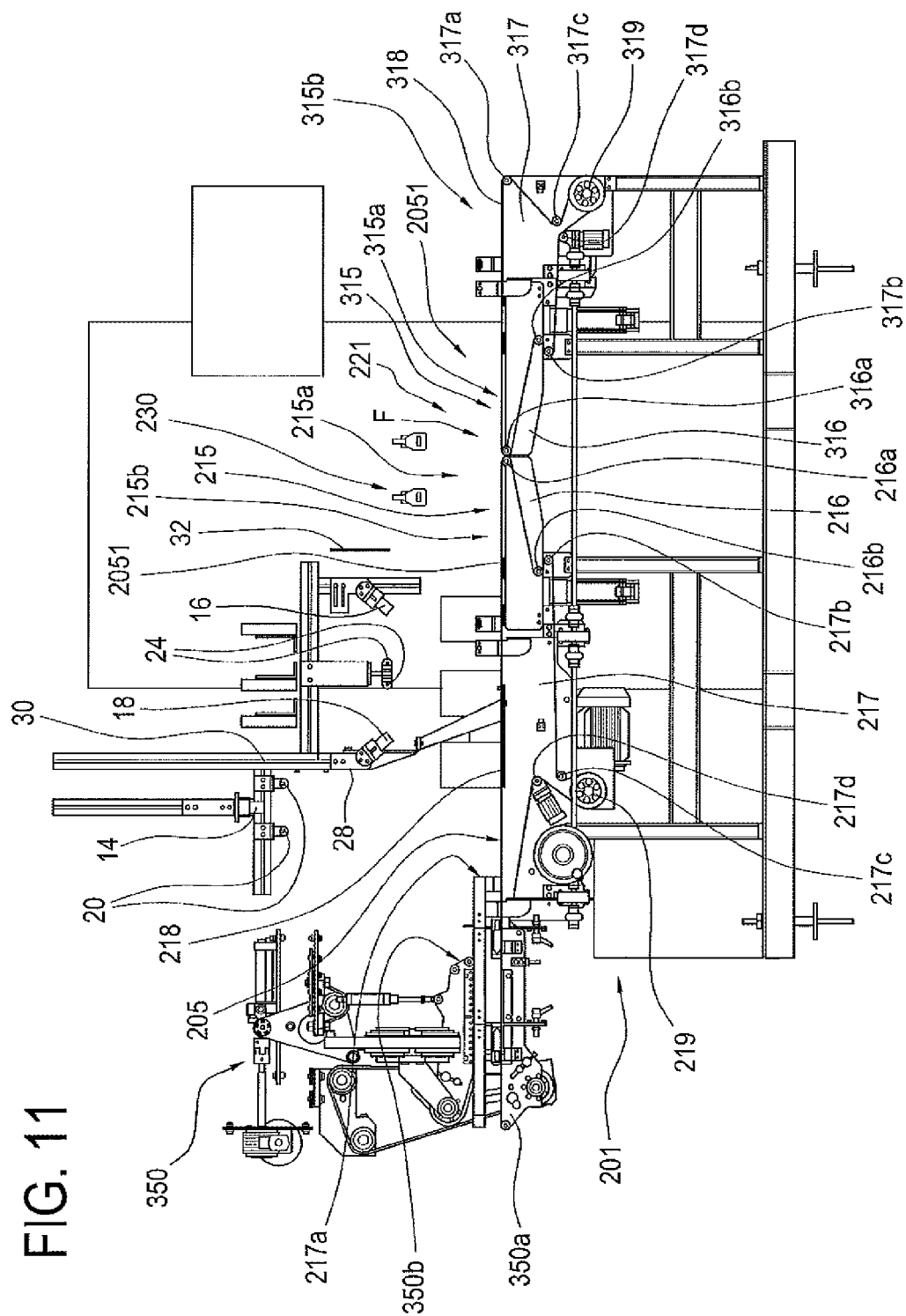
FIG. 11 is a schematic side view of the further preferred embodiment of the unit according to this invention.
Figure 12:
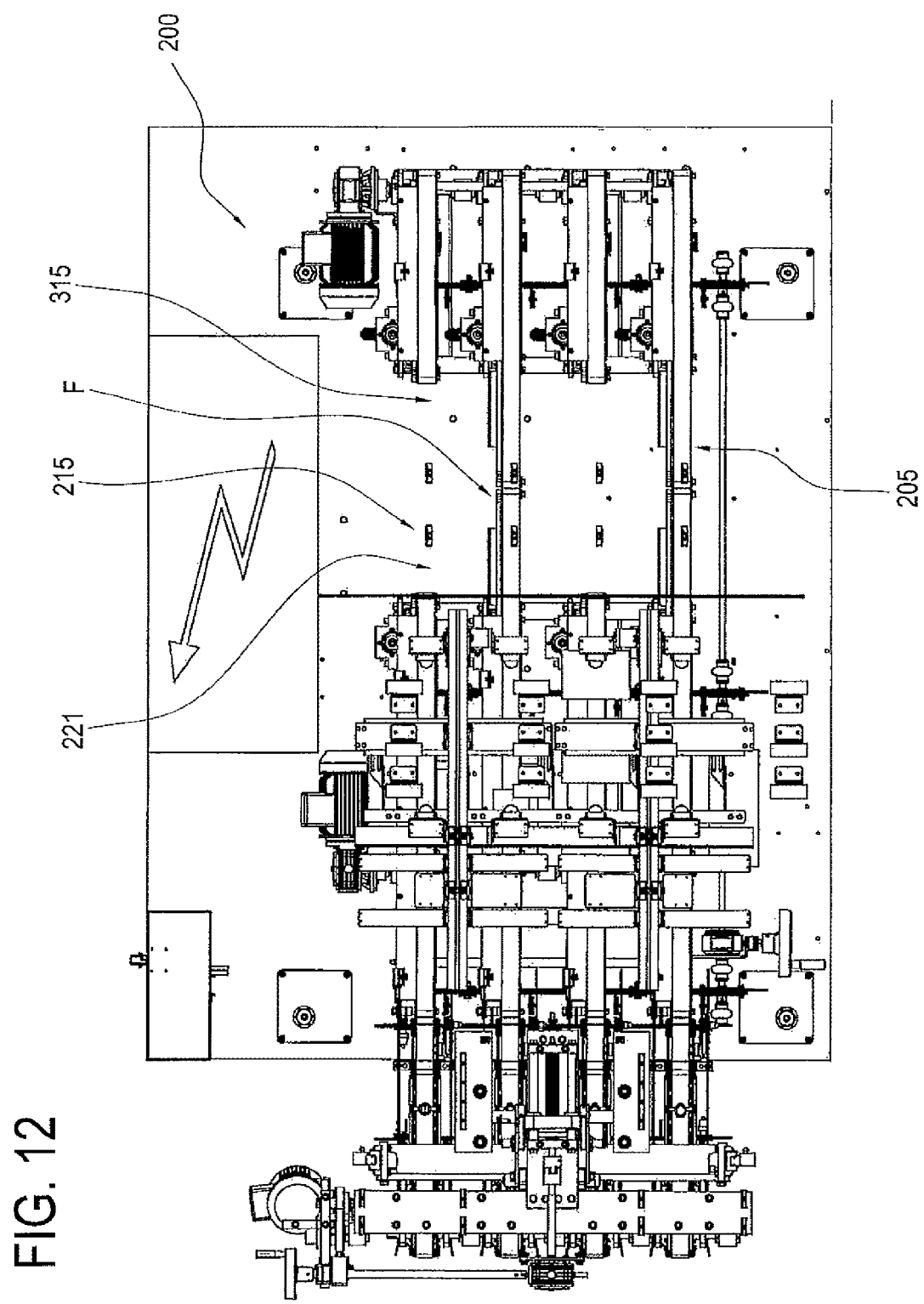
FIG. 12 is a schematic top plan view of the further preferred embodiment of the unit according to this invention.
Figure 13:
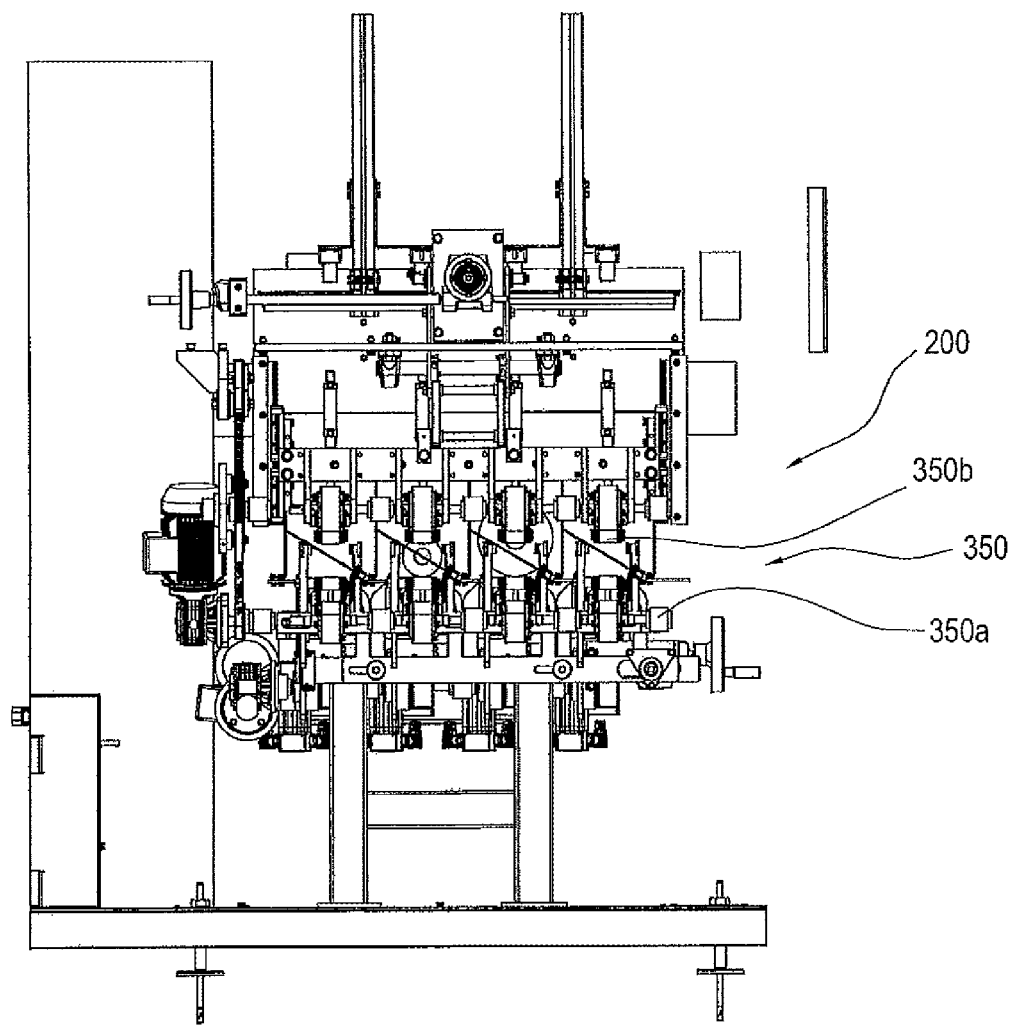
FIG. 13 is a schematic view of the rear transverse face of the further preferred embodiment of the unit according to this invention.

FIG. 9 shows a preferred or typical embodiment 50 of a pack of rolls 11 which can be processed in the plant of the invention and illustrated, in particular, under normal conveying conditions.

As illustrated, the pack 50 comprises a plurality of rolls 11, suitably positioned and held together by a respective outer wrapper 51, preferably made of plastic material, sealed on its lateral faces 52, 53 and underside face 54. Only the seal on the face 53 is shown in FIG. 9. Further, the top face 55 of the pack is normally provided with a trademark or logo and/or other graphical elements. Further graphical elements, for example a barcode, may be provided on the underside face 54 of the product or pack.

The second preferred embodiment 120 comprises means 14 for detection from above which are similar in every way to those of the first preferred embodiment described above and which are not commented on again so as to avoid making this description too lengthy.

The second preferred embodiment 120 of the control or management unit, in particular for detecting defective products, advantageously comprises image capturing means 150 which are adapted to take snapshots of the product from below in order to capture at least one image of the underside face 112i of the respective product.

It is thus possible to detect corresponding features present on the underside face of the product.

Further advantageously, the second preferred embodiment 120 of the control or management unit, in particular for detecting defective products, comprises image capturing means 170, 190 which are adapted to take snapshots of the product from a respective side in order to capture at least one image of the corresponding lateral face 112*s*, 112*d* of the respective product.

More specifically, as illustrated, the image capturing means 170, 190 are adapted to take snapshots of the product from both sides in order to capture at least one image of the corresponding lateral face 112*s*, 112*d* of the respective product.

It is thus possible to detect corresponding features present on the corresponding lateral face of the product.

The second preferred embodiment 120 of the unit for detecting products, in particular defective products, uses a camera 14 positioned above, whose respective lens 14' is directed perpendicularly or totally perpendicularly to the product supporting surface 15' of the corresponding conveying means 5 and which is similar in every way to the one of the first preferred embodiment.

Advantageously, in the second preferred embodiment 120, the camera means comprise a corresponding camera positioned laterally of the product conveying means 15, in particular a first and a second camera 170, 190 positioned on opposite sides of the product conveying means 15 and, in particular, whose respective lens 170', 190' is directed parallel or substantially parallel to the product supporting surface 15' of the conveying means 5.

In practice, as illustrated, in the second preferred embodiment, the camera means advantageously comprise a corresponding camera positioned laterally of the product conveying means, in particular a first and a second camera 170, 190 positioned on opposite sides of the product conveying means 15 and, in particular, whose respective lens 170', 190' is positioned at, or substantially at, the perpendicular centre line of the product to be detected.

Advantageously in the second preferred embodiment, the camera means comprise a corresponding camera 150 which is positioned under the product conveying means and, in particular whose respective lens 150' is directed perpendicularly or substantially perpendicularly to the product supporting surface 15' of the conveying means 5.

That way, it is easy to take snapshots of the underside face of the product, in particular without interfering with the product conveyor, that is to say, without substantially disturbing normal plant operation.

More specifically, the camera means advantageously comprise a camera 150 which is positioned under the product conveying means and, in particular, whose lens 150 is positioned at the transverse centre line of the conveying means 5, in particular at the transverse centre line of the product 11 to be detected.

It will be understood, however, that corresponding detection means, in particular of the camera type, similar to the ones denoted by the reference numeral 150 and which take snapshots of the product from below might also be used in the first preferred embodiment described previously.

More specifically, advantageously, the conveying means 5 comprise opening means 15*a* for detection of the product by the camera 190 positioned below.

More specifically, advantageously, the conveying means 5 comprise, at the opening means 15*a*, corresponding conveying means, or rotating belts 150, 150 which engage and feed the product forward as it passes by the opening means 15*a*. As illustrated, the product feed means 150, 150 simultaneously engage the respective product 112 from opposite sides.

More specifically, as illustrated, the top and bottom detection means are situated in a zone of the conveying means which is separate from the zone in which the means for detecting the lateral faces of the product are situated, the means 170, 190, for detecting the lateral faces being, as illustrated, preferably situated in a zone upstream of the zone where both of the cameras 14, 150 with the perpendicularly directed lenses are situated.

According to the second preferred embodiment of the unit for detecting products, in particular defective products, the corresponding electronic processing means advantageously determine, or are adapted to determine, whether the printing on the wrapper of the product or pack is not centred or well positioned.

In the second, preferred embodiment, the respective electronic processing means also advantageously determine, or are adapted to determine, whether the product or pack, or rather, the related wrapper, is incorrectly sealed.

In the second, preferred embodiment, the respective electronic processing means also advantageously determine, or are adapted to determine, whether the product or pack, or rather, the related wrapper, contains an article that is incorrectly positioned or rotated.

In the second, preferred embodiment, the respective electronic processing means also advantageously determine, or are adapted to determine, whether there is paper trapped in the seal of the product or pack, or rather, of the related wrapper.

In the second, preferred embodiment, the respective electronic processing means also advantageously determine, or are adapted to determine, whether there is a break in the wrapping film (for example, a hole caused by excessive heat during sealing or by tearing).

The unit of the second preferred embodiment in turn comprises respective lighting means, suitably controlled and connected to respective detection or camera means, not illustrated in detail in the accompanying drawings and which may be similar in every way to those described previously in connection with the first preferred embodiment.

Advantageously, the plant of the invention includes means for eliminating the defects detected, in particular in the form of means which remove the defective product, such as the ones denoted by the reference numeral 121 in FIG. 3, which eliminate the defective packs from the conveying line, in particular by means of corresponding means for engaging and pushing the product 112 off the conveying line 5.

Although not illustrated in detail in the accompanying drawings, the defect detection unit 12, 120 is, with the exception of the processing and defective product display means, housed in an enclosure, preferably of an openable type, which hides the detection zone from the external environment and which is open at its opposite ends, or which comprises open transverse end walls, to allow the product to exit the detection unit 12 itself.

Moreover, the cameras of the invention may be equipped with filters to highlight the wavelengths most suitable for the detection to be carried out, in particular as a function of the wavelength of the light sources or emitters used.

FIGS. 10 to 15 show a further, or third, preferred embodiment 200 of the unit or apparatus for the control or management of products, in particular rolls, in particular defined by rolls 111 of paper material, and which is usable in a plant for making such products.

As in the first preferred embodiment 12 described above, the further or third embodiment 200 of the unit for the control and management of products, or rolls, is preferably installed in a plant comprising at least one operating line including at least one upstream section for making the articles, in particular in the form of a log saw for cutting rolls off respective elongate logs, at least one respective packaging section, in particular for primary packaging, preferably in the form of a packing section where the articles or rolls are packed and preferably at least one or more further packaging sections, in particular in the form of at least one bagging section where the packs are placed in bags and/or one palletizing section where the packs or bags are placed on pallets.

The plant also comprises a conveying section, or means, by which the products are transported between one section of the plant and another, in particular between the means which make the articles and the respective packaging section and/or between one packaging section and another downstream and further comprises processing means for controlling the functioning of the plant sections. Further, also the unit 200 for controlling and managing products and rolls is equipped with respective processing means for controlling operation, like the first preferred embodiment 12 of the unit.

In this further preferred embodiment 200 of the unit, the components which are similar to those of the first preferred embodiment are labelled with the same reference characters and are not commented upon in detail again so as to avoid making this description too lengthy.

The further preferred embodiment 200 of the control unit differs from the first preferred embodiment described above in that it comprises means 221 adapted to eliminate the respective product or roll, in particular defective product or roll 111.

As illustrated, this second preferred embodiment 200 of the control or management unit advantageously comprises a respective frame, or supporting means, 201 which mounts the means 221 for eliminating the respective products or rolls, in particular defective products or rolls 111.

As illustrated, the control or management unit 200 comprises means 205 for conveying the products or rolls, in particular in the form of corresponding conveyor belt means, and preferably, a plurality of parallel conveyor belt means running side by side, as described in more detail in the rest of this description below.

Advantageously, the means 221 for eliminating the products or rolls are in the form of means which let the respective product or roll 111 drop from the corresponding conveying means 215, 315 of the unit 200 itself.

More specifically, the eliminating means 221 are in the form of means which move the product supporting means 205', in particular of the means 215, 315 for conveying the products or rolls and let the product or roll 111 drop under the supporting means 205', in particular of the conveying means 215, 315 of the unit itself.

In practice, advantageously, the unit 200 comprises corresponding conveying means 205, which comprise respective first and second conveying means 215, 315, which are longitudinally aligned with each other and which are driven independently of each other, coordinated by the corresponding computer means which control the unit 200 or the plant this unit is installed in.

In practice, advantageously, the means which let the product or roll 111 drop are defined by corresponding conveying means 205, which comprise respective conveying means 215, 315 of the control or management unit.

Thus, advantageously, as may be inferred from the drawings, the means for eliminating the product or roll are in the form of means which let the product or roll drop and comprise means 215, in particular first conveying means, extending upstream of the dropping point or zone F and/or means 315, in particular second conveying means which extend downstream of the dropping point or zone F.

This makes it possible to operate in a particularly rapid and efficient manner.

It is understood, however, that a further embodiment might imaginably comprise only single conveying means 215 adapted to let the respective product or roll 111 drop.

Advantageously, as may be inferred from the drawings, the respective conveying means 215, 315 comprise an end portion 215a, 315a which is movable longitudinally or telescopically relative to a fixed portion 251b, 315b of the conveying means themselves.

As illustrated, advantageously, the respective conveying means 215, 315 comprise a portion, in particular an end portion 215a, 315a which is movable between a position, in particular an advanced position, where it supports and conveys the product, and a position, in particular a retracted position, where it lets the product or roll 111 drop.

More specifically, as illustrated, the movable portions 215a, 315a of the respective conveying means 215, 315, respectively upstream and downstream, are movable in opposite longitudinal directions, so as to respectively move apart to let the product or roll drop, and towards each other to restore the normal condition of conveying the products or rolls.

More specifically, the respective movable or telescopic end portion 215a, 315a comprises a body 216, 316, which mounts respective rollers, or sliding means 216a, 216b, 316a, 316b for corresponding belt means 218, 318, and is movable, in particular longitudinally movable, relative to a fixed body 217, 317 which mounts respective rollers or sliding means 217a, 217b, 217c, 217d, 317a, 317b, 317c, 317d of the belt means 218, 318 themselves.

As illustrated, the respective movable or telescopic body 216, 316 of the respective conveying means 215, 315 comprises an end roller, in particular a top end roller 216a, 316a, defining the product transporting surface, and a return roller 216b, 316b, which is longitudinally spaced from, and perpendicularly lower than, the end roller 216a, 316a. As illustrated, the respective fixed body 217, 317 of the respective conveying means 215, 315 comprises an end roller 217a, 317a, in particular a top end roller defining the product transporting surface, in particular with the corresponding roller 216a, 316a of the movable body 216, 316, and a return roller 217b, 317b, which is longitudinally spaced from, and perpendicularly lower than, the end roller 217a, 317a, the return roller 217b, 317b defining with the corresponding return roller 216b, 316b of the movable body 216, 316a section of variable length for compensating the extension of the corresponding belt means 218, 318.

As illustrated, the fixed body 217, 317 mounts further return rollers, in particular a first and a second return roller 217c, 217d, 317c, 317d for the belt means 218, 318 which come out of a corresponding drive means, or wheel, 219, 319 of the belt means 218, 318 themselves.

Figure 15:
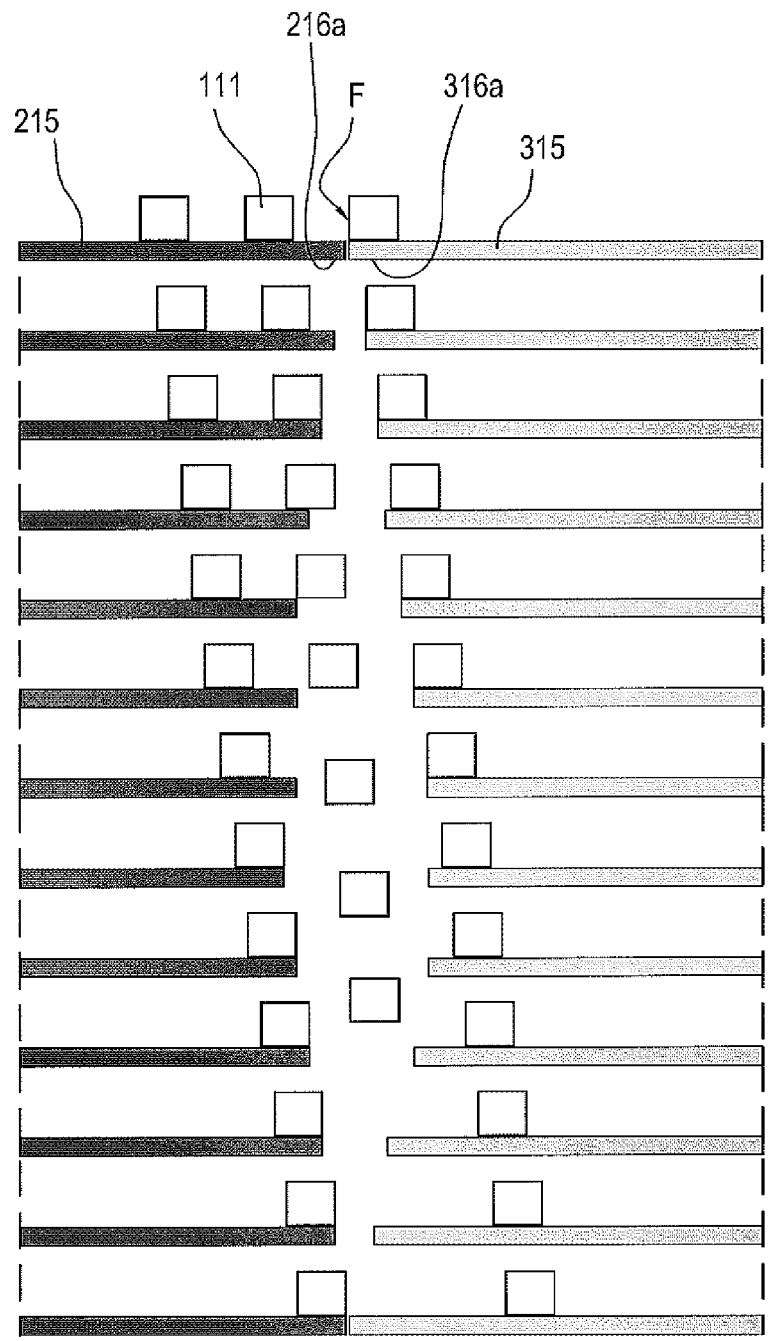
FIG. 15 illustrates the different steps of a preferred procedure for eliminating the rolls in the further preferred embodiment of the unit according to this invention.

More specifically, as may be inferred from FIG. 15, the unit or apparatus 200 moves the respective movable ends 216a, 316a apart and away from the dropping point or zone F where the product or roll 111 is dropped.

Advantageously, as may be well inferred from FIG. 15, the respective conveying means 215 which allow the product or roll to drop, cause it to advance towards the dropping point or zone F of the product or roll itself while they move the respective movable end 216a away from the dropping point or zone F.

Advantageously, the respective conveying means 215, 315 which allow the product or roll 111, to drop, while they advance the respective product or roll towards the dropping point or zone F and/or while they allow it to drop, also cause the other products or rolls to advance.

Also, advantageously, while the respective conveying means 215, 315 restore normal operating conditions, that is, while they remove the dropping point or zone F, that is, while they move the respective movable end 216a towards the dropping point or zone F, or while they move the respective movable ends towards each other and towards the zone or position of mutual juxtaposition, cause the respective products or rolls to advance.

Advantageously, means 230 are provided for pushing and/or directing the expulsion or dropping of the product or roll 111.

More specifically, the means 230, 230 for pushing and/or directing the expulsion or dropping of the product or roll 111 are in the form of corresponding air jet means.

More specifically, the means 230, 230 for pushing and/or directing the expulsion or dropping of the product or roll 111 are in the form of means for emitting a corresponding air jet towards the point or zone of expulsion of the product or roll, in particular towards the dropping point or zone F.

More specifically, as illustrated, the means 230, 230 for pushing and/or directing the elimination or dropping of the product or roll 111 are in the form of means for emitting a corresponding air jet downwardly.

More specifically, as illustrated, the means 230, 230 for pushing and/or directing the elimination or dropping of the product or roll 111 are located at the elimination or dropping zone F, being in particular positioned above the conveying means 215, 315, substantially at the dropping point or elimination or dropping zone F.

Advantageously, the means 230, 230 for emitting a corresponding air jet are activated, or emit a respective air jet, while the corresponding conveying means 215, 315 are letting, or are about to let, the product or roll drop.

More specifically, as illustrated, the means for emitting a corresponding air jet advantageously comprise a first emitter 230 and a second emitter 230 of a corresponding air jet, which, as illustrated, are preferably longitudinally spaced from each other.

As illustrated, more specifically, the respective conveying means 215, 315 are in the form of a rotating belt or band on the positive, or upper, stretch of which the corresponding conveyed product or roll 111 rests.

As illustrated, the conveying means 215, 315 are completed by corresponding lateral guides whose width or distance apart is variable so as to be able to convey products or rolls of different sizes.

More specifically, the further unit 200, like the first unit described above, comprises means for detecting defective products or rolls which correspond, and are similar in all respects, to those of the first unit and which are not described again in detail in order to avoid making this description too lengthy.

More specifically, in any case, the unit 200 for detecting defective products or rolls comprises means 14, 16, 18 for capturing at least one corresponding image, in particular a plurality of images, of the respective product or roll.

More specifically, the unit 200 for detecting defective products comprises camera means 14, 16, 18 for capturing one or more images, of the respective product and which are adapted to take snapshots of the top, front and rear sides of the respective product or roll, as set out in connection with the first preferred embodiment described above.

Figure 16:
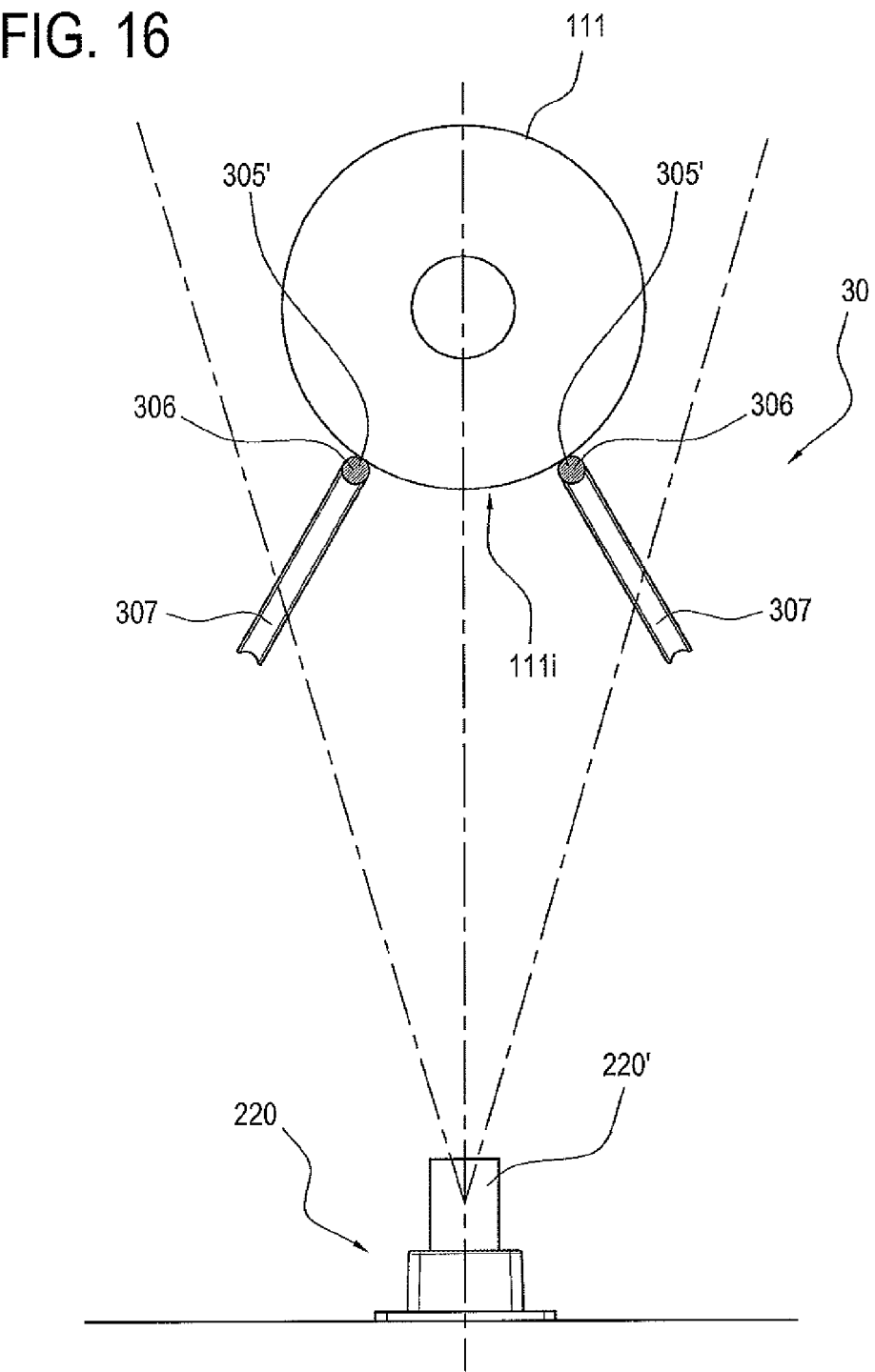
FIG. 16 is a schematic transverse cross section of a further embodiment of the means usable in the unit of the invention.
Figure 17A:
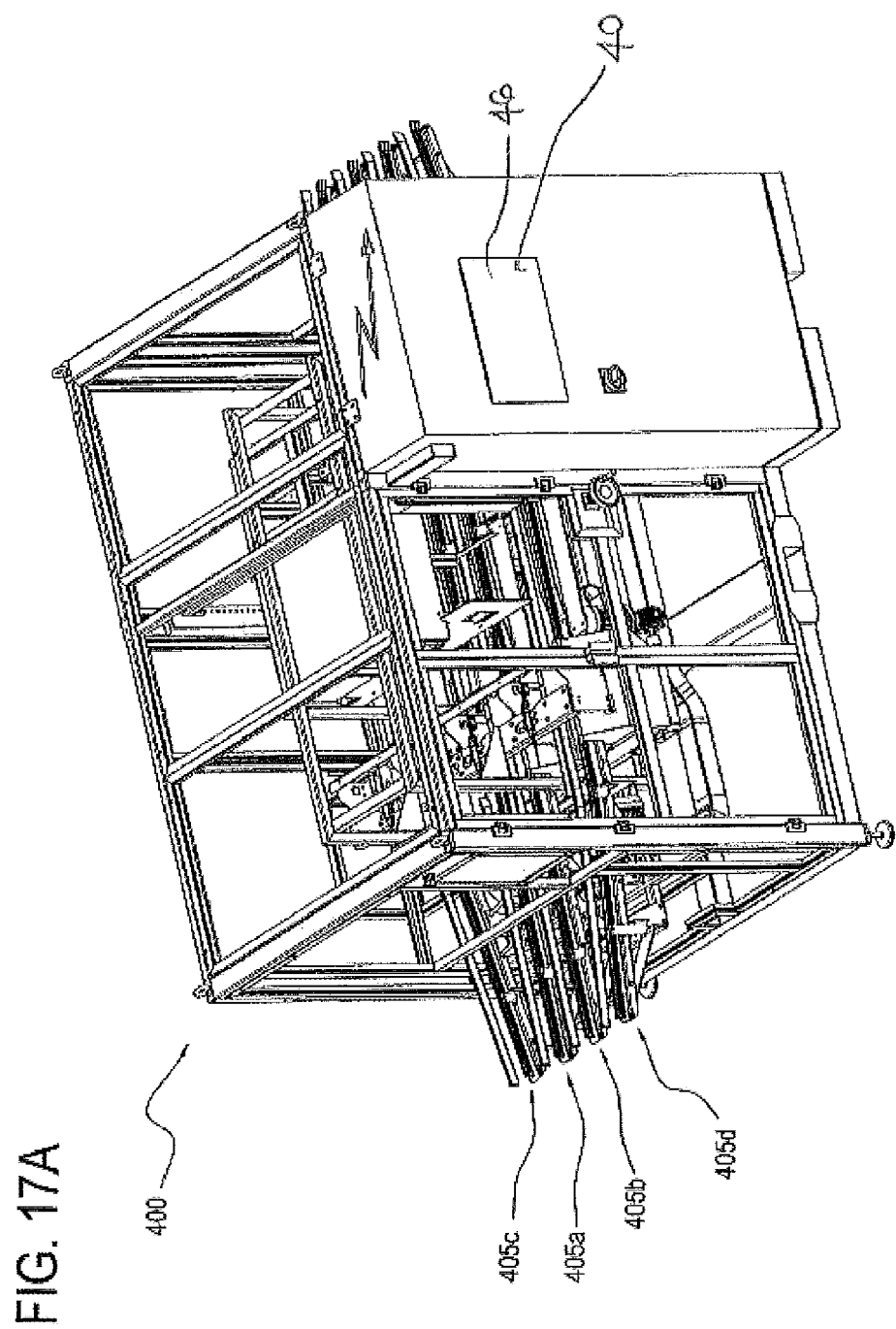
FIGS. 17A to 17D show a fourth preferred embodiment of the unit according to this invention in respective perspective, side and top views.
Figure 17B:
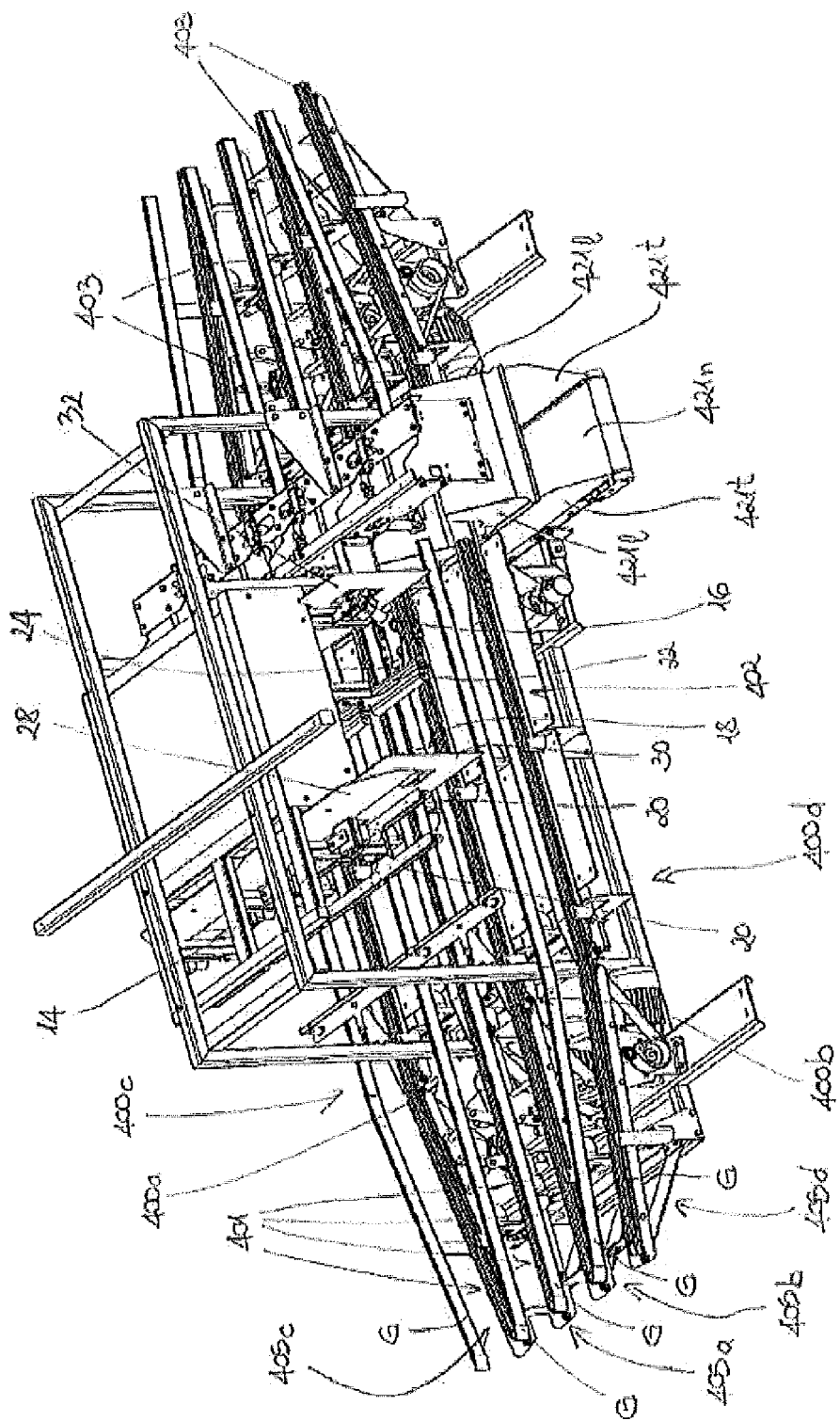
Figure 17C:
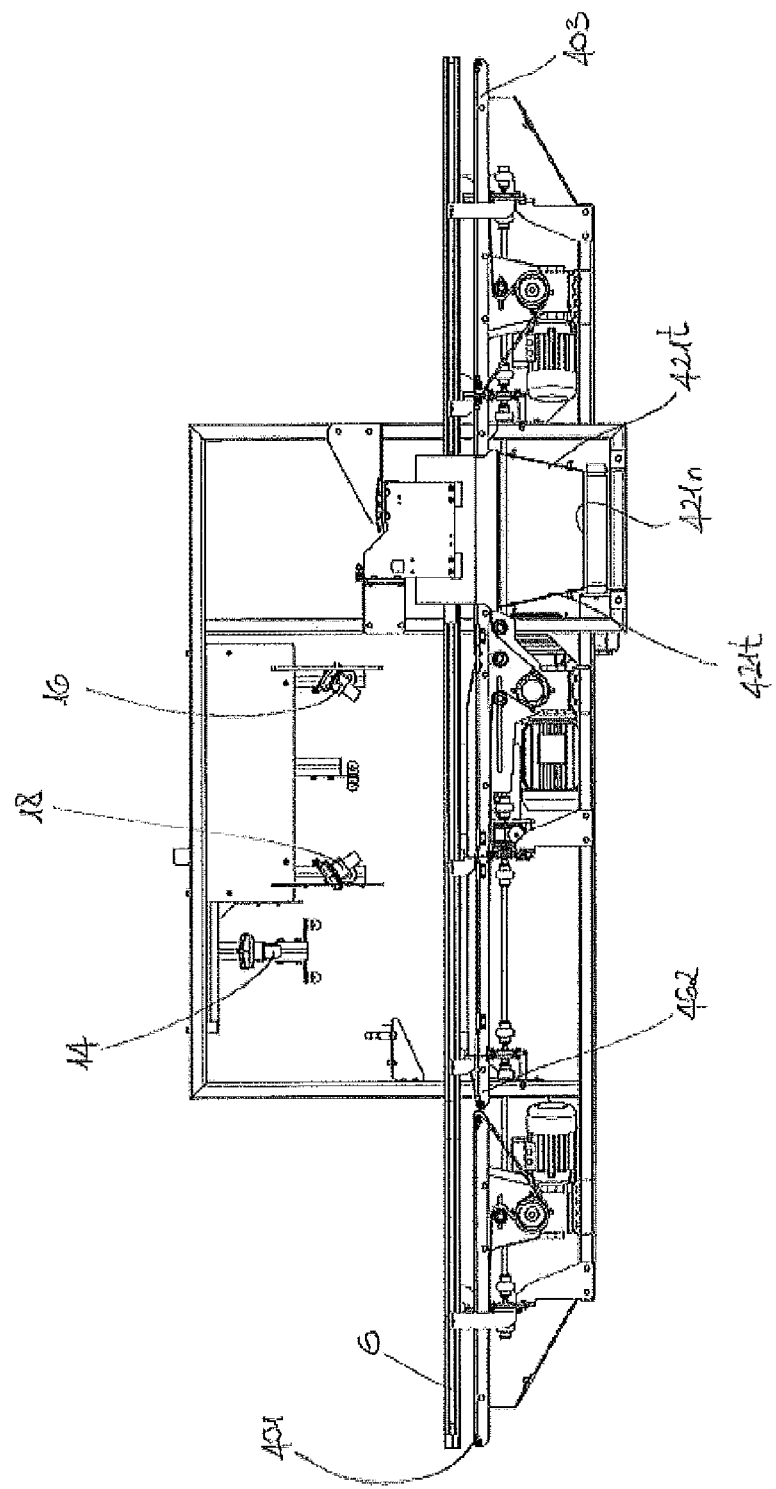
Figure 17D:
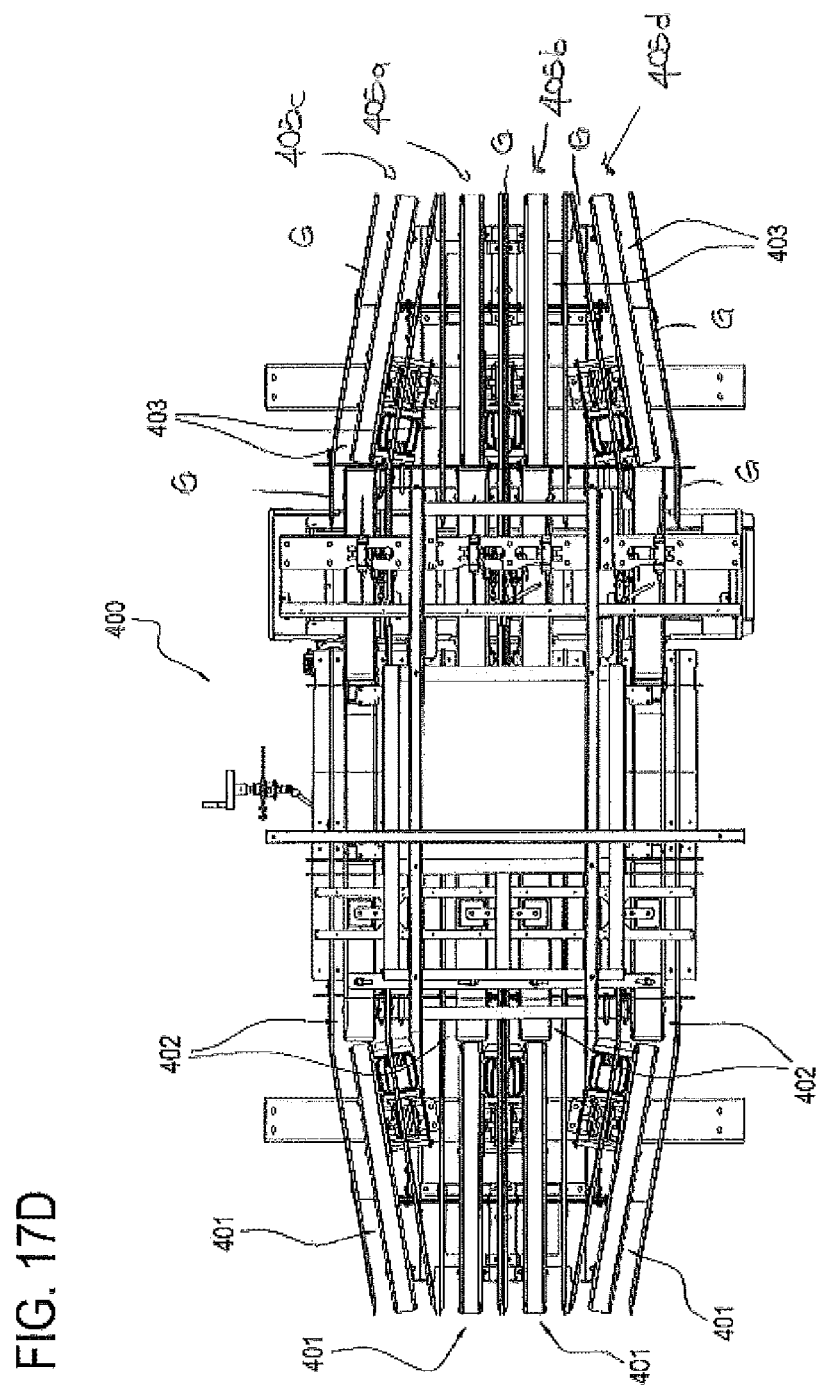

Further advantageously, as may be inferred from FIG. 16, detection means 220 capable of taking snapshots of the product or roll from below might imaginably also be applied to the unit 200 in order to capture at least one image of the underside face 111i of the respective product or roll 111.

Advantageously, as illustrated, the means for detecting the underside face of the respective product or roll comprise a corresponding camera 120 which is positioned under the corresponding means 305 for conveying the product or roll and, in particular, whose lens 220' is directed perpendicularly or substantially perpendicularly to the underside surface 111i of the product or roll resting on the conveying means 305.

More specifically, the camera means advantageously comprise a corresponding camera 220 whose respective lens 220' is positioned at the transverse centre line of the conveying means 305 or means for supporting the product or roll, and in particular at the transverse centre line of the product 111 to be detected.

More specifically, as illustrated, the camera means 220 positioned under the conveying means 305 are perpendicularly spaced from the product supporting surface 305' of the conveying means themselves.

Advantageously, as illustrated, the means 305 for conveying the product or roll, in particular at the means 220 for detecting the underside surface of the product, comprise first and second means 306, 306 for supporting the underside surface 111i of the product or roll and which are transversely spaced from each other to define between them a viewing space suitable for the selfsame underside surface 111i of the product or roll.

Advantageously, the means 305 for conveying the product, in particular at the means 220 for detecting the underside surface of the product, and preferably the first and second means for supporting the underside surface of the product or roll, comprise a corresponding elongate member or cable 306 which is movable along the product feed direction in order to transport the products or rolls and which is adapted to transversely define a corresponding specific support for the underside surface 111i of the product or roll.

Advantageously, the first and second elongate members or cables 306, 306 are mounted on corresponding elongate members 307, 307 which longitudinally define corresponding guide means for the respective elongate cable member 306, 306, the elongate mounting members 307, 307 being inclined at an angle to the vertical, in particular converging on each other in the direction towards the underside surface 111i of the product or roll.

More specifically, as illustrated, the bottom camera 220 is situated under the conveying means 305, being in particular transversely positioned between the first and second means for supporting the underside surface of the product or roll and preferably being positioned at the centre line thereof.

Advantageously, as illustrated, the means for eliminating the products or rolls are located downstream, in particular immediately downstream, of the means for detecting the products or rolls 111, being supported on the same supporting means 201 as the unit 200.

In practice, the means for eliminating the products or rolls and the means for detecting the products or rolls 111 have conveying means 215 in common and are also supported on the same supporting means 201.

Advantageously, the means for eliminating the products or rolls are activated by the corresponding electronic control or processing means of the unit 200 or of the plant the unit 200 is installed in, so as to eliminate a corresponding defective product or roll when such product or roll is detected by the selfsame means for detecting the products or rolls 111 of the unit 200.

Advantageously, as illustrated, the unit 200 comprises means 350 which are adapted to define a predetermined longitudinal detection spacing between the products or rolls being conveyed and which are positioned upstream of the means for detecting and/or eliminating the defective products or rolls.

More specifically, advantageously, the means adapted to define a predetermined longitudinal spacing between the products or rolls being conveyed are mounted on the same supporting means as the unit itself.

More specifically, the means 350 which are adapted to define a predetermined spacing between the products or rolls comprise means for conveying the products or rolls and moving at a predetermined speed suitable for spacing the products or rolls as required while they are being conveyed.

As illustrated, the means 350 which are adapted to define a predetermined spacing between the products or rolls comprise a lower conveyor belt 350a and an upper conveyor belt 350b which engage respective opposite top and underside faces of the product or roll.

Further, as illustrated, the lower conveying means 350a of the means which define the predetermined spacing between the rolls transfer the products directly to the conveying means 215 on which the means for detecting the product or roll and/or the means for eliminating the products or rolls are positioned.

More specifically, as illustrated, the unit 200 comprises a plurality of conveying lines running side by side and preferably parallel, in particular four parallel conveying lines running side by side, which operate independently of each other.

FIGS. 17A to 20 illustrate a further, fourth preferred embodiment 400 of the unit or apparatus, with components that are similar or equivalent to those of the preceding preferred embodiments, labelled with the same reference numerals as those used for the preceding preferred embodiments and not described again in detail so as to avoid making this description too lengthy.

More specifically, like the first preferred embodiment, the fourth embodiment of the unit for the control or management of products comprises image capturing means 14 for taking snapshots of the product from above in order to capture at least one image of the top face of the respective product and/or capturing means 16 for taking snapshots of the respective product from the front side in order to capture at least one image of the front face of the product and/or capturing means 18 for taking snapshots of the product from the rear side in order to capture at least one image of the rear face of the respective product.

More specifically, the fourth preferred embodiment 400 thus comprises means 14, 16, 18 for capturing at least one corresponding image, in particular a plurality of images, of the respective product, that is, corresponding camera means 14, 16, 18 for capturing one or more images, of the respective product.

More specifically, like the first preferred embodiment, the fourth preferred embodiment of the unit for the control or management of products comprises camera means which comprise a corresponding camera 14 positioned above the product conveying means and, in particular, whose respective lens is directed perpendicularly or substantially perpendicularly to the product supporting surface of the conveying means and, especially, which is adapted to take snapshots of the product from above in order to capture at least one image of the top face of the respective product.

More specifically, like the first preferred embodiment, the fourth preferred embodiment of the unit for the control or management of products comprises camera means which comprise a corresponding camera, in particular a first and a second camera 16, 18, respectively positioned above the product conveying means and, in particular, whose respective lenses are inclined at respective angles to the product supporting surface of the conveying means.

More specifically, like the first preferred embodiment, the fourth preferred embodiment of the unit for the control or management of products comprises camera means which comprise a corresponding camera 16 whose respective lens is inclined at a respective angle to the product supporting surface of the conveying means, the lens being directed along the direction opposite to the product feed direction, and, especially, which is adapted to take snapshots of the front side of the product in order to capture at least one image of the front face of the respective product.

More specifically, like the first preferred embodiment, the fourth preferred embodiment of the unit for the control or management of products comprises camera means which comprise a corresponding camera 18 whose respective lens is inclined at a respective angle to the product supporting surface of the conveying means, the lens being directed along the same direction as the product feed direction and, especially, which is adapted to take snapshots of the rear side of the product in order to capture at least one image of the rear face of the respective product.

More specifically, the camera means 14, 16, 18 are positioned above the conveying means at a distance from the product supporting surface of the selfsame conveying means such that they are higher up than the maximum height reachable by a plurality of product types or sizes which can be processed in the plant.

More specifically, like the first preferred embodiment, the fourth preferred embodiment 400 of the unit for the control or management of products comprises corresponding means 20, 20, 22, 24 for lighting the respective product or roll at the respective detection zone and/or means 28, 30, 32 for reflecting the radiation used to light the product, already described in connection with the first preferred embodiment of the unit.

More specifically, like the first preferred embodiment, the fourth preferred embodiment 400 of the unit for the control or management of products comprises electronic processing means 40, in particular provided with program means or software means and, especially, provided with corresponding display means 46, in particular of the touch-screen type.

More specifically, the fourth preferred embodiment 400 of the unit for the control or management of products comprises electronic processing means 40 which are configured to receive at least one image of the respective product or roll from the means for capturing at least one corresponding image of the product or roll, in particular from the camera means 14, 16, 18 and which are configured to process the image and then to determine whether that product has one or more corresponding defects, in particular operating in the same way as described above in connection with the other preferred embodiments of the control or management unit.

Advantageously, the fourth preferred embodiment 400 of the unit for the control or management of products, in particular of rolls, comprises respective means 405 for conveying the products or rolls and which comprise a plurality of conveying lines 405a, 405b, 405c, 405d which are, in particular, defined by corresponding conveyor belt means designed to feed respective rows of products or rolls aligned with each other.

Advantageously, the means 14, 16, 18 for capturing images of the products or rolls, and the respective accessory means, that is, the lighting means and/or the reflection means, are conveniently provided at each line 405a, 405b, 405c, 405d for conveying the products or rolls, these lines in particular defining a plurality of respective stages 400a, 400b, 400c, 400d for the control or management of products or rolls.

Advantageously, therefore, the stages 400a, 400b, 400c, 400d for the control or management of the products or rolls operate independently of each other, processing respective rows of products or rolls, in particular received from the conveying means of the plant the unit is installed in or cooperates with.

More specifically, as illustrated, the conveying lines 405a, 405b, 405c, 405d run side by side and also, as illustrated, the conveying lines 405a, 405b, 405c, 405d run parallel with each other at least for a certain stretch of their paths.

More specifically, as illustrated, the conveying lines comprise at least a first line 405a and a second line 405b for conveying the products or rolls and which are transversely spaced from each other.

More specifically, as illustrated, the conveying lines comprise a third line 405c for conveying the products or rolls and which is, in particular, transversely spaced from the line adjacent to it, and a fourth line 405d for conveying the products or rolls, which is, in particular, transversely spaced from the line adjacent to it and which is, preferably, provided on the side opposite to the third conveying line 405c.

Advantageously, the respective line 405a, 405b, 405c, 405d for conveying the products or rolls comprises a respective first stretch 401 for feeding the products or rolls, in particular receiving the products or rolls from corresponding conveying means of the plant, and a second stretch 402 for feeding the products or rolls, which is situated downstream of the first feed stretch and which, in particular, receives the products or rolls from the first stretch 401 of the control and management unit 400.

Advantageously, the respective product conveying line comprises a third, or last, stretch 403 for feeding the products or rolls, which is situated downstream of the second feed stretch 402, and which, in particular, receives the products or rolls from the second feed stretch 402.

Advantageously, the means 421 for eliminating the respective product or roll are provided at the respective line 405a, 405b, 405c, 405d for conveying the products or rolls.

Advantageously, as may be inferred from the corresponding drawings, the means 14, 16, 18 for capturing images of the products or rolls and/or the means 421 for eliminating the respective product or roll are provided at the respective second stretch 402 for feeding the products or rolls on the respective conveying line 405a, 405b, 405c, 405d.

Advantageously, as may be inferred from the corresponding drawings, the first feed stretch 401 of the respective line 405a, 405b for conveying the products or rolls extends in parallel with the first feed stretch 401 of the adjacent conveying line. More specifically, as illustrated, the initial stretches of the first and second conveying lines 405a, 405b are parallel with each other and extend longitudinally of the conveying lines of the plant this unit is installed in.

Advantageously, the first feed stretch 401 of the respective line 405c, 405d for conveying the products or rolls diverges from the first feed stretch 401 of the adjacent conveying line.

It is thus possible to define a larger transverse space between the corresponding conveying lines, in particular between the third and fourth conveying lines 405c, 405d and the respective first and second conveying lines 405a, 405b adjacent thereto, especially at the respective second stretch 402 for feeding the products or rolls.

Advantageously, the conveying lines 405a, 405b, 405c, 405d have respective second or intermediate stretches 402 for feeding the products or rolls and which extend in parallel with each other.

More specifically, as illustrated, the third or last feed stretch 403 of the respective line 405a, 405b, 405c, 405d for conveying the products or rolls is parallel and/or convergent with the third or last feed stretch 403 of the adjacent conveying line.

In practice, the third or last stretches 403 of the respective first and second lines 405a, 405b, for conveying the products or rolls are parallel with each other, whilst the third or last feed stretch 403 of the respective third or fourth line 405c, 405d for conveying the products or rolls is convergent with the third or last feed stretch 403 of the adjacent conveying line 405a, 405b.

Advantageously, as may be inferred in particular from the corresponding figures from 18A to 18E, also the fourth embodiment of the control and management unit comprises means 421 which are adapted to eliminate the respective product or roll from the respective conveying line 405a, 405b, 405c, 405d and which are provided at the respective product conveying line 405a, 405b, 405c, 405d, in particular at the corresponding second or intermediate stretch 402 of the same line for conveying the products or rolls, especially in a zone 402b downstream of a zone 402a of the same second or intermediate stretch 402 for feeding the products or rolls and which is provided with the means for detecting the products or rolls.

Advantageously, as may be inferred from the corresponding drawings, means 421 are provided which are adapted to eliminate the respective product or roll from the respective conveying line 405a, 405b, 405c, 405d and which comprise means 421p for engaging and removing the respective product or roll from the conveying line.

Advantageously, in the fourth preferred embodiment, too, the means for eliminating the products or rolls are activated by the corresponding electronic control or processing means, in particular of the unit 400 or of the plant the unit 400 is installed in, so as to eliminate a corresponding defective product or roll when or after such product or roll is detected by the selfsame means for detecting the products or rolls of the unit 400.

Advantageously, the means 421p for engaging and removing the respective product or roll from the respective line 405a, 405b, 405c, 405d for conveying the products or rolls are in the form of means for pushing the corresponding product or roll.

More specifically, as illustrated, the means 421p for engaging and removing the respective product or roll from the respective conveying line 405a, 405b, 405c, 405d are in the form of means for pushing the corresponding product or roll in a direction transverse to the direction of longitudinal extension of the conveying line 405a, 405b, 405c, 405d itself.

Advantageously, the means 421 for eliminating the respective product or roll from the respective conveying line 405a, 405b, 405c, 405d define means for displacing the corresponding product or roll the respective conveying line 405a, 405b, 405c, 405d.

Advantageously, as may be inferred from the corresponding drawings, the means 421p for engaging and removing the respective product or roll from the conveying line 405a, 405b, 405c, 405d are provided beside the corresponding lines 405a, 405b, 405c, 405d for conveying the products or rolls.

Advantageously, as may be inferred from the corresponding drawings, the means 421p for engaging and removing the respective product or roll from the conveying line 405a, 405b, 405c, 405d are positioned between adjacent lines 405a, 405b, 405c, 405d for conveying respective products or rolls.

Figure 18A:
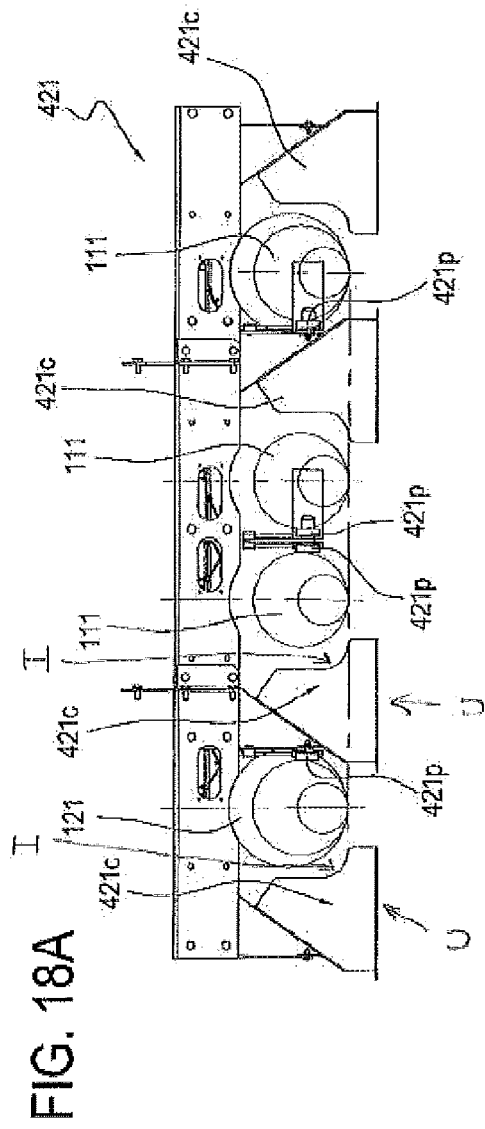
FIGS. 18A to 18E are respective views showing the means for eliminating the products from the respective conveying line of the fourth preferred embodiment of the unit according to this invention.
Figure 18B:
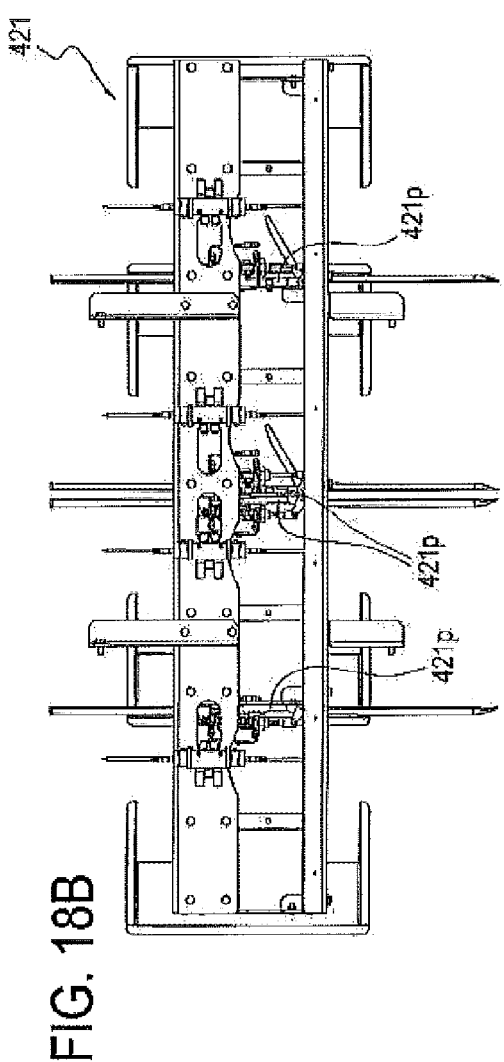
Figure 18C:
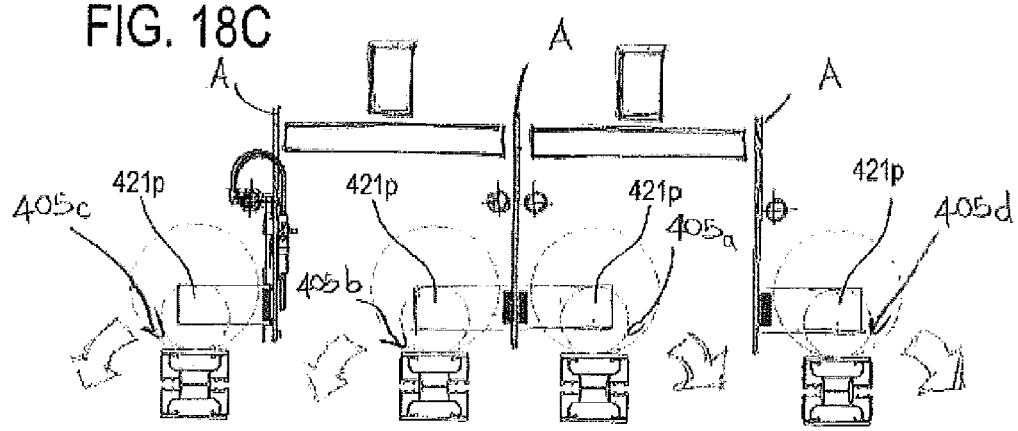
Figure 18D:
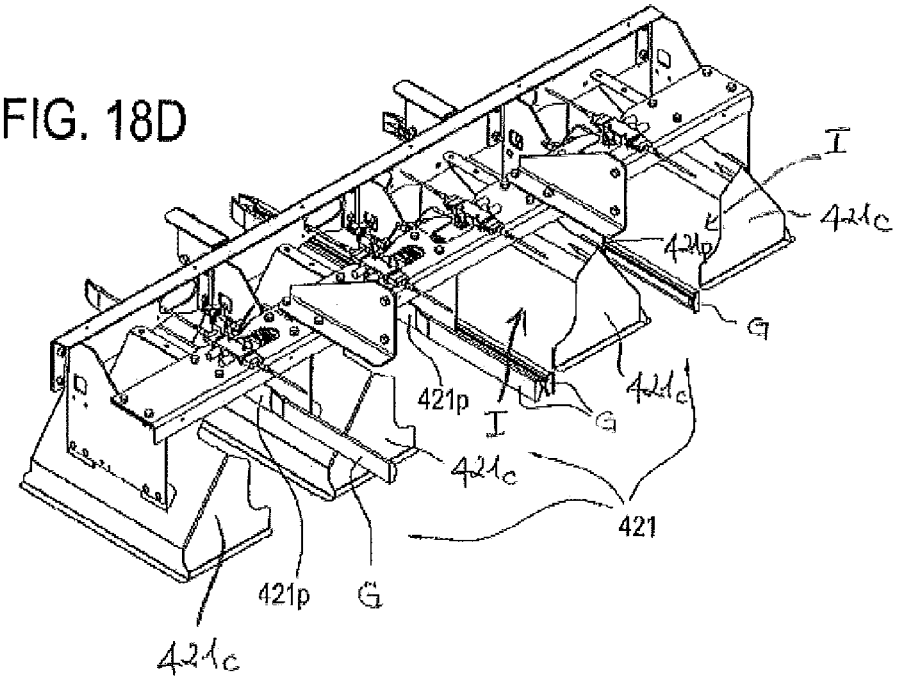
Figure 18E:
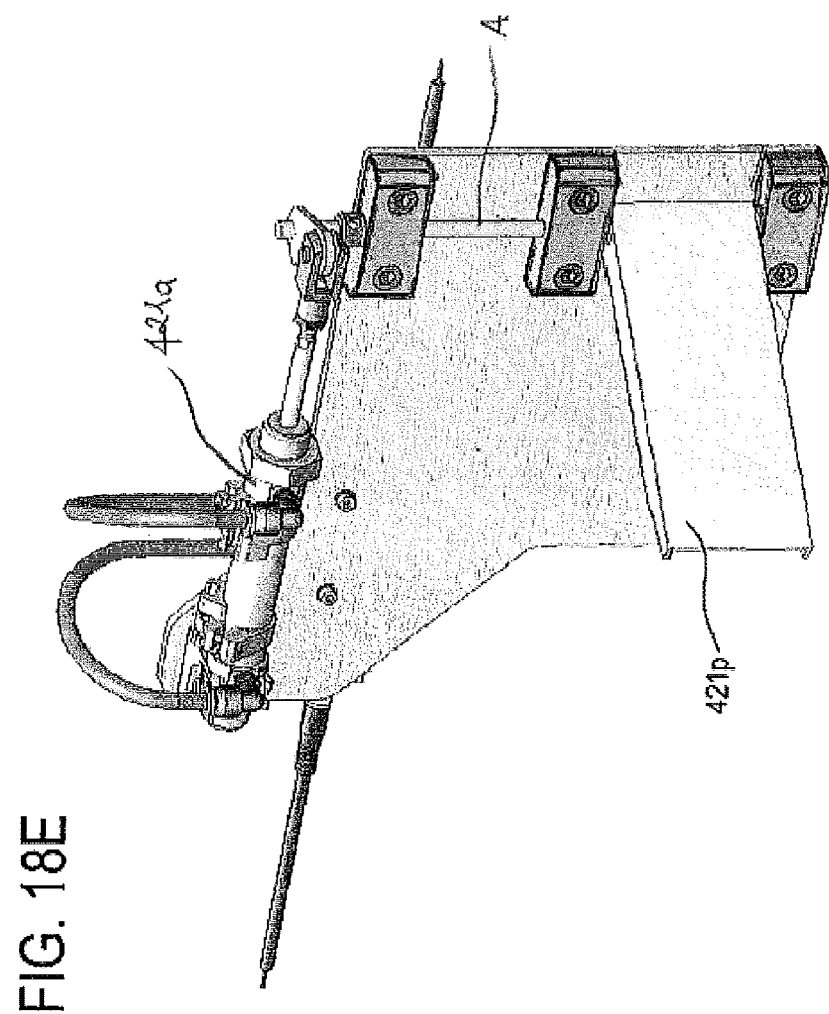

Advantageously, as may be inferred from FIGS. 18A and 18C, the means 421p for engaging and removing the respective product or roll from the conveying line 405a, 405b, 405c, 405d are movable between a rest position, in particular a position allowing the products or rolls to move on downstream, and a position where they engage and remove the respective product or roll from the corresponding conveying line 405a, 405b, 405c, 405d.

Advantageously, the means 421 for eliminating the respective product or roll from the respective conveying line 405a, 405b, 405c, 405d comprise respective means 421c for channeling the product or roll removed from the conveying line 405a, 405b, 405c, 405d and which, in particular, are adapted to guide the respective product or roll along a direction below the conveying means 405a, 405b, 405c, 405d themselves.

Advantageously, the means 421c for channeling the product or roll removed from the corresponding conveying line 405a, 405b, 405c, 405d are provided beside the conveying line 405a, 405b, 405c, 405d itself, in particular on the side opposite to that where the means 421p for engaging and removing the respective product or roll from the conveying line 405a, 405b, 405c, 405d are located.

Advantageously, the means 421c for channeling the product or roll removed from the corresponding conveying line 405a, 405b, 405c, 405d are in the form of a respective hollow diverting member 421c which has a respective opening I for feeding in the respective product or roll, which opens onto the respective conveying line 405a, 405b, 405c, 405d and which faces towards the opposing means 421p for engaging and removing the product or roll from the corresponding conveying line 405a, 405b, 405c, 405d, and an opening U for feeding out the product or roll, which opens downwards and which allows the respective product or roll to drop under the respective conveying line 405a, 405b, 405c, 405d.

Advantageously, the means for engaging and removing the respective product or roll from the corresponding conveying line 405a, 405b, 405c, 405d comprise paddle means 421p for engaging and pushing the product or roll off the respective conveying line and, in particular, the paddle means are in the form of a single paddle 421p for each conveying line 405a, 405b, 405c, 405d.

Advantageously, the paddle means 421p, when at the rest position, are oriented parallel to, or longitudinally of, the respective conveying line 405a, 405b, 405c, 405d or conveyor belt of the respective second or intermediate stretch 402 of the conveying line 405a, 405b, 405c, 405d.

Advantageously, the paddle means 421p are movable transversely to the respective conveying line 405a, 405b, 405c, 405d, in particular between a rest position and a position where they engage and remove the product or roll from the respective conveying line 405a, 405b, 405c, 405d, and vice versa.

Advantageously, the paddle means 421p are rotatable about an axis A perpendicular to the respective conveying line 405a, 405b, 405c, 405d.

The reference label 421a indicates means for actuating the respective paddle means 421p, the actuating means being, in particular, in the form of respective pneumatic actuating means consisting of respective pneumatic cylinders 421a which cause the respective shaft, in particular the vertical shaft A, with which the respective paddle means 421p are integral, to rotate angularly More specifically, the respective pneumatic actuator or cylinder rotationally drives the shaft A which mounts the respective paddle 421P between a first, rest position where the paddle 421p, extends longitudinally and a second position where it engages and removes the respective product or roll from the line and where the respective paddle 421p extends transversely above the respective conveying line.

More specifically, as illustrated, at the respective rest position, the paddle means 421p are longitudinally aligned with corresponding guide profiles G and, in particular, define part of the guide profiles.

Advantageously, the means 421p for engaging and removing the respective product or roll from the first and second conveying lines 405a, 405b are situated between the first and second conveying lines 405a, 405b themselves and in particular, at the rest position, are placed side by side and parallel with each other.

More specifically, as illustrated, the means 421p for engaging and removing the respective product or roll from the third and/or fourth conveying line 405c, 405d are situated between the respective conveying lines 405c, 405d and the respectively adjacent line 405a, 405b.

More specifically, as illustrated, the respective means 421c for channeling the product or roll removed from the corresponding conveying line 405a, 405b, 405c, 405d are situated on the outer side of the respective conveying line 405c, 405d, 405a, 405b, 405c, 405d and, in particular, the respective means 421c for channeling the product or roll removed from the first and second conveying lines 405a, 405b are located between these and the corresponding third and/or fourth conveying line 405c, 405d situated respectively on the outer side of the respective first and/or second conveying line.

Advantageously, means 421n are provided for collecting and moving away from the unit the products or rolls removed from the conveying lines 405a, 405b, 405c, 405d.

Advantageously, the means 421n for collecting and moving away from the unit the products or rolls removed from the conveying lines 405a, 405b, 405c, 405d extend transversely to the conveying lines 405a, 405b, 405c, 405d, in particular under the means 421p for engaging and removing the respective product or roll and/or under the respective means 421c for channeling the product or roll removed from the corresponding conveying line 405a, 405b, 405c, 405d.

Advantageously, as illustrated, the means for collecting and moving away from the unit the products or rolls removed from the conveying lines 405a, 405b, 405c, 405d comprise a respective conveyor belt 421n.

More specifically, as illustrated, the means for collecting and moving away from the unit the products or rolls removed from the conveying lines 405a, 405b, 405c, 405d comprise respective containment side walls 421t, 421t, which, in particular, project above the conveyor belt 421n for collecting and moving away the products or rolls removed and which are connected to the corresponding longitudinal end walls 421l of the means 421c for channeling the product or roll removed from the corresponding conveying line 405a, 405b, 405c, 405d.

Figure 19C:
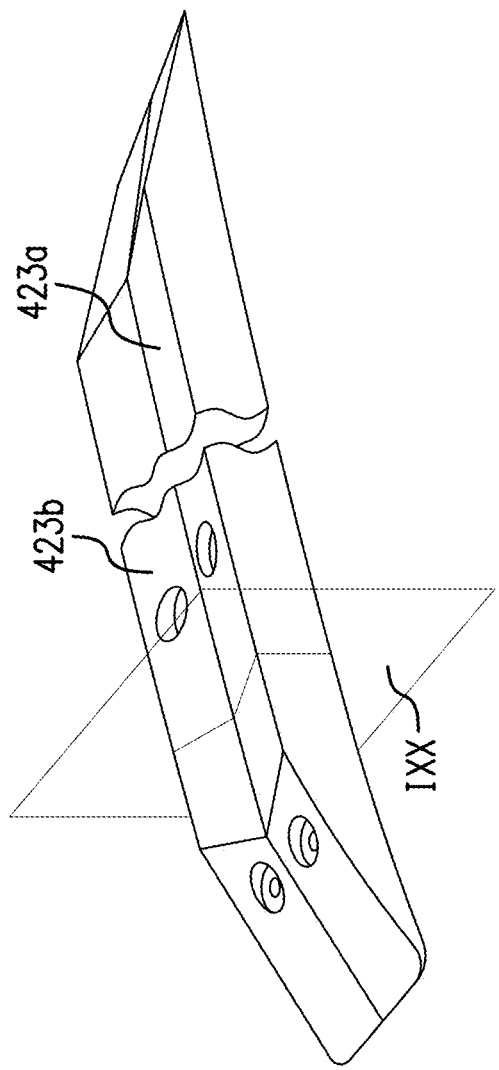
Figure 19B:
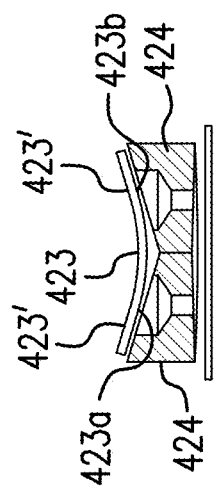

Advantageously, as may be inferred from FIGS. 19A to 19C, means are provided for keeping the respective product centred as it moves forward on the respective conveying means 405a, 405b, 405c, 405d.

Advantageously, as may be inferred from the corresponding drawings, the means 423 for keeping the respective product or roll centred engage the underside surface of the product or roll.

Advantageously, as may be inferred from the corresponding drawings, the means 423 for keeping the respective product or roll centred support the product or roll resting on them by gravity.

Advantageously, as may be inferred from the corresponding drawings, the means for keeping the respective product or roll centred are defined by the corresponding conveyor belt 423 which transports the product or roll and, in particular, which defines the respective second stretch 402 for feeding the products or rolls on the respective conveying line 405a, 405b, 405c, 405d.

Advantageously, the means for keeping the respective product centred comprise respective side sections 423', 423' of the band 423 of the corresponding conveyor belt, converging towards the centre of the conveyor belt itself. More specifically, the side sections 423', 423' are connected to each other by a corresponding central strip of the selfsame band 423. The side sections 423', 423' are defined by a corresponding fixed block 424 of the respective conveyor belt which supports the sliding band 423 of the conveyor belt and which deforms the band 423 to define the convergent side sections 423', 423'.

Advantageously, the means for keeping the respective product centred thus comprise respective inclined surfaces 423a, 423b which converge towards the central section of the conveyor belt and on which the flexible band 423 of the conveyor belt itself slides, the surfaces 423a, 423b being, in particular, adapted to impart a cradle-like shape to the flexible band 423 of the conveyor belt.

Advantageously, the respective conveyor belt 423 which defines the second feed stretch 402 of the conveying line 405a, 405b, 405c, 405d comprises, in particular downstream of the branch 402a for keeping the respective product or roll centred, a branch 402b having a flat configuration, in particular to allow defective products, if any, to be unloaded from the respective conveying line 405a, 405b, 405c, 405d.

In practice, advantageously, the same flexible band 423 defining the means for keeping the product or roll centred, becomes level, in particular downstream of the branch 402a for centring the product or roll, and defines a flat configuration 402b, which, in particular, allows defective products or rolls, if any, to be unloaded.

Advantageously, the means for defining a predetermined longitudinal detection spacing between the products or rolls being conveyed comprise first means 401 for conveying the products or rolls, which receive the products or rolls from conveying means upstream, in particular from the conveying means of the plant the unit is installed in, the first means 401 for conveying the products or rolls feeding the products or rolls at a speed higher than the speed of the conveying means upstream, and second means 402 for conveying the products, which receive the products or rolls from the first conveying means 401 and which are situated downstream thereof, the second conveying means 402 feeding the products or rolls at a speed higher than the speed of the first conveying means 401 of the unit.

More specifically, advantageously, the second conveying means 402 convey the products or rolls at and through the zone where the products are detected and/or the zone where the selfsame rolls are eliminated from the respective conveying line.

Figure 20:
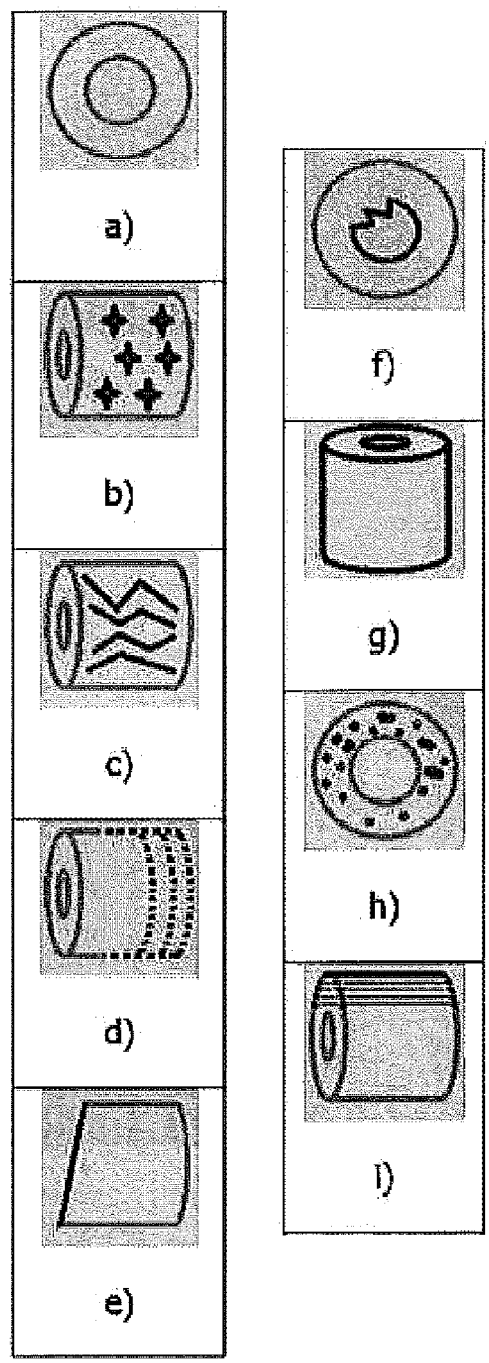
FIG. 20 shows the icons representing a corresponding condition of the product or roll detected.

Advantageously, as may be inferred from FIG. 20, for each product detected and analysed, corresponding electronic control or processing means, in particular of the unit 400 or of the plant the unit 400 is installed in, highlight and display, in particular on the display of the respective operator, in particular on the display of the control and management unit 400, an icon or drawing or any other graphical illustration suitable for the purpose, to represent the state of the respective product or roll and, in particular, one or more of the following product states or conditions:

product without defects or whose defectiveness is at a level considered acceptable; and/or product defective, in particular having one or more specific types of defects or non-conformities.

Advantageously, for each product detected and analysed, an icon or drawing or any other graphical illustration suitable for the purpose is displayed on the display of the respective operator, in particular on the display of the control and management unit 400, to represent the state of the respective product or roll and that is to say, if the product is without defects or if its defectiveness is at a level considered acceptable, an icon or drawing representing the product or roll is displayed whole, and/or if the product or roll has a respective defect or type of defect, a respective icon or drawing representing the product or roll is displayed with respective parts or sections of it indicating the respective defect or type of defect of that product or roll. This rapidly gives the operator an immediate picture of the situation.

Advantageously, the unit is adapted to display on the display of the respective operator, in particular on the display of the control and management unit 400 itself, an icon or drawing 20a identifying the detection of a conformant roll, and/or an icon or drawing 20b identifying the detection of non-conforming printing of the logo on the paper of the roll, and/or an icon or drawing 20c identifying the detection of irregularities on the outside surface of the roll, and/or an icon or drawing 20d identifying the detection of a roll of non-conforming length, and/or an icon or drawing 20e identifying the detection of a roll whose end is cut obliquely, and/or an icon or drawing 20f identifying the detection of a misshapen core, in particular an excessively misshapen core, and/or an icon or drawing 20g identifying the detection of an incorrectly positioned roll, and/or an icon or drawing 20h identifying the detection of a dirty roll, in particular a roll whose respective transverse face is dirty, and/or an icon or drawing 20i identifying the detection of a roll with non-conforming diameter.

More specifically, advantageously, the electronic processing means of the unit, or respective electronic processing means of the plant the unit is installed in or cooperates with, are configured to process the images captured and to determine whether or not the product has one or more corresponding defects, in particular defects, relating to:

non-conforming printing of the logo on the paper of the roll, irregularities on the outside surface of the roll, non-conforming roll length, roll whose end is cut obliquely, roll core misshapen, in particular excessively misshapen, incorrectly positioned roll, roll dirty, in particular having dirty transverse face, roll with non-conforming diameter, roll with unglued end edge.

More specifically, also the fourth preferred embodiment 400 of the unit for the control and management of products or rolls comprises electronic processing means, in particular of the unit 400, or respective electronic processing means of the plant the unit is installed in or cooperates with, which determine the product acceptability or defectiveness from a value which is determined, or calculated, for a parameter representing a particular characteristic of the product itself, the acceptability or defectiveness of the product or roll being, in particular, differentiated or classified based on a predetermined threshold value with which the determined or calculated value representing a specific characteristic of the product is compared.

More specifically, as illustrated, the respective threshold value can be set directly from a respective operator panel or control means by the operator in charge of supervising the unit and/or the plant.

Advantageously, the threshold value set by the operator from a respective operator means or panel relates to one or more of the following defects:

non-conforming printing of the logo on the paper of the roll,
irregularities on the outside surface of the roll,
non-conforming roll length,
roll whose end is cut obliquely,
roll core misshapen, in particular excessively misshapen,
incorrectly positioned roll,
roll dirty, in particular having dirty transverse face,
roll with non-conforming diameter,
roll with unglued end edge.

Advantageously, detection of dirt on the transverse face of the product or roll is carried out by way of images captured by the front and/or rear camera means 16, 18.

More specifically, the dirty transverse face of the product or roll may be due to dust resulting from sharpening the roll cutoff blade of the log saw forming part of the plant the unit is installed in.

Figure 21A:
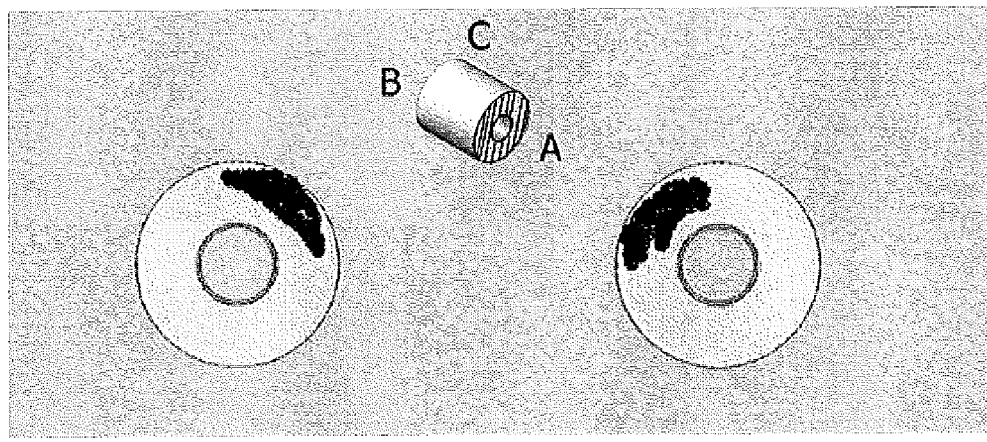
FIGS. 21A to 21H show example embodiments relating to corresponding modes of detecting the product designed to detect corresponding defects of the product or roll.

Advantageously, the unit 400 is configured to—or comprises electronic processing means of the unit, or respective electronic processing means of the plant the unit is installed in or cooperates with, which are configured to—determine the area of the respective transverse surface of the product or roll whose surface differs from the rest of the same transverse surface of the same product or roll, being for example darker in colour than the rest of the transverse surface of the product or roll, as may be inferred from FIG. 21A. The sensitivity threshold which distinguishes between a product whose transverse surface is unacceptably dirty, and which is therefore non-conforming, and a conformant product, can be set manually by the operator from respective means, in particular from the respective operator panel 46 of the unit 400 itself.

Advantageously, detection of a misshapen core of the product or roll is carried out by way of images captured by the front and/or rear camera means 16, 18.

Figure 21B:
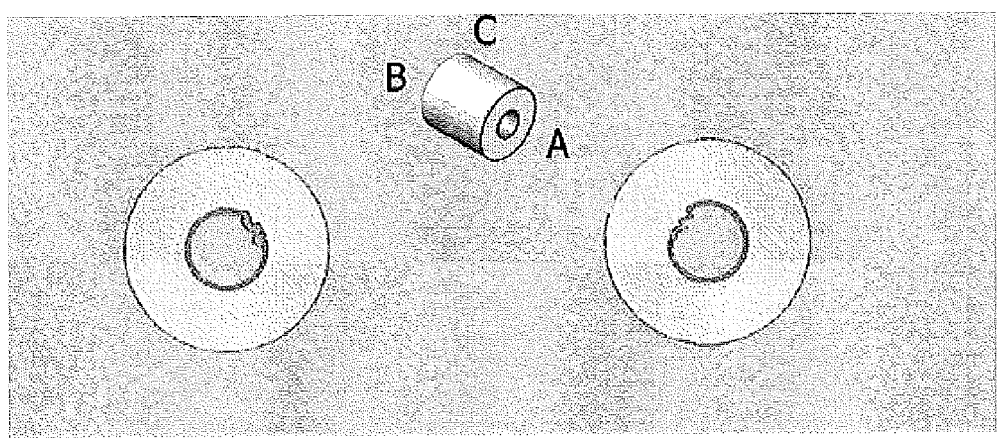

Advantageously, the unit 400 is configured to—or comprises electronic processing means of the unit, or respective electronic processing means of the plant the unit is installed in or cooperates with, which are configured to—determine the misshapenness of the core, in particular the misshapenness of the profile of the core of the product or roll, as may be inferred from FIG. 21B. The sensitivity threshold which distinguishes between a product or roll whose core is unacceptably misshapen, and which is therefore non-conforming, and a conformant product, can be set manually by the operator from respective means, in particular from the respective operator panel 46 of the unit 400 itself.

Advantageously, detection of the centring of the printing, or of the logo or decorations is carried out by way of images captured by the top camera means 14.

Figure 21C:
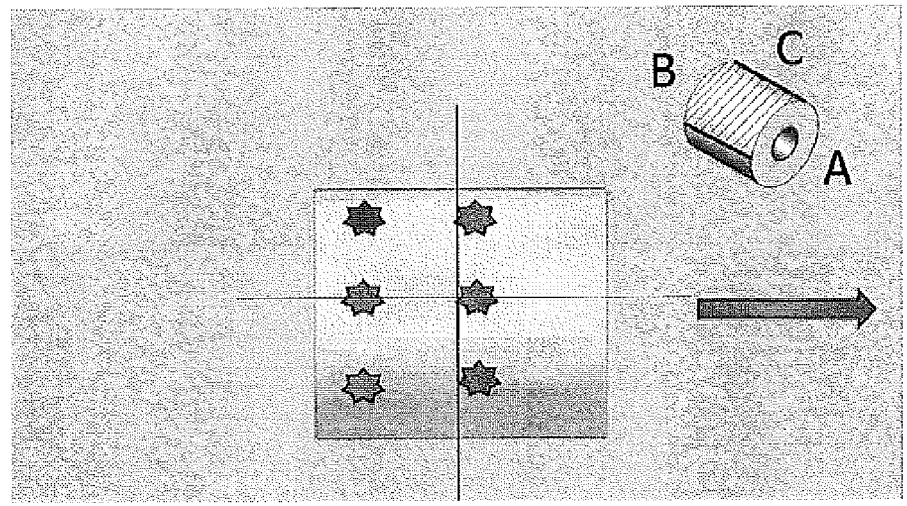

Advantageously, the unit 400 is configured to—or comprises electronic processing means of the unit, or respective electronic processing means of the plant the unit is installed in or cooperates with, which are configured to—determine the centring of the printing, or of the logo or decorations, on the outside surface of the product or roll by determining the distance of one or more of the logos or decorations from the respective longitudinal ends, or transverse faces, of the product or roll, as may be inferred from FIG. 21C. The sensitivity threshold which distinguishes between a product or roll whose logos or decorations are unacceptably displaced from the required position, and which is therefore non-conforming, and a conformant product or roll, can be set manually by the operator from respective means, in particular from the respective operator panel 46 of the unit 400 itself.

Advantageously, detection of the diameter of the product or roll is carried out by way of images captured by the top camera means 14.

Figure 21D:
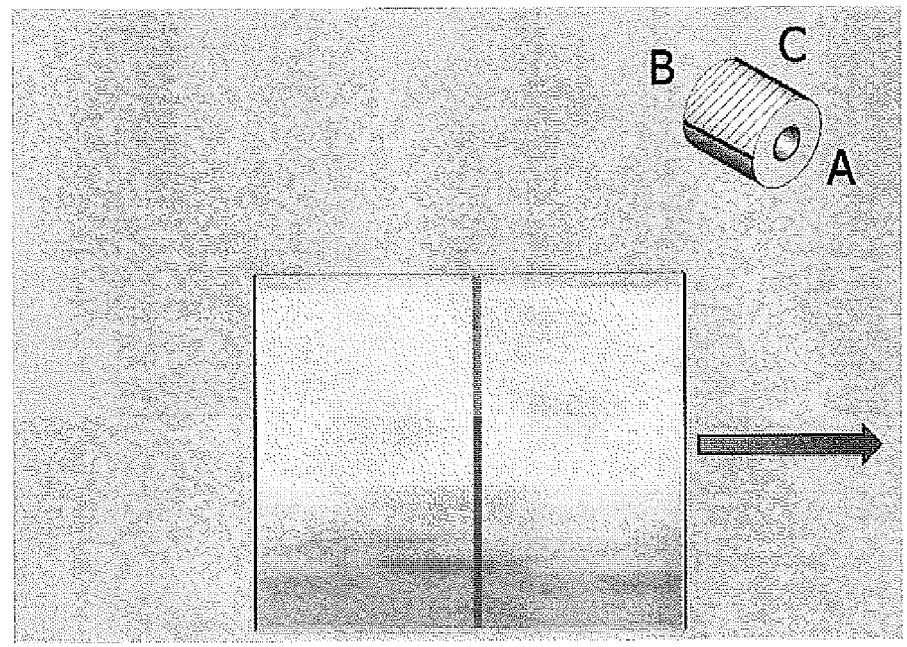

Advantageously, the unit 400 is configured to—or comprises electronic processing means of the unit, or respective electronic processing means of the plant the unit is installed in or cooperates with, which are configured to—determine the diameter of the product or roll by determining the distance between the transverse or lateral edges of the product or roll, as may be inferred from FIG. 21D. The sensitivity threshold which distinguishes between a product whose diameter is unacceptably different from a nominal value, and which is therefore non-conforming, and a conformant product or roll, can be set manually by the operator from respective means, in particular from the respective operator panel 46 of the unit 400 itself.

Advantageously, detection of the length of the product or roll is carried out by way of images captured by the top camera means 14.

Figure 21E:
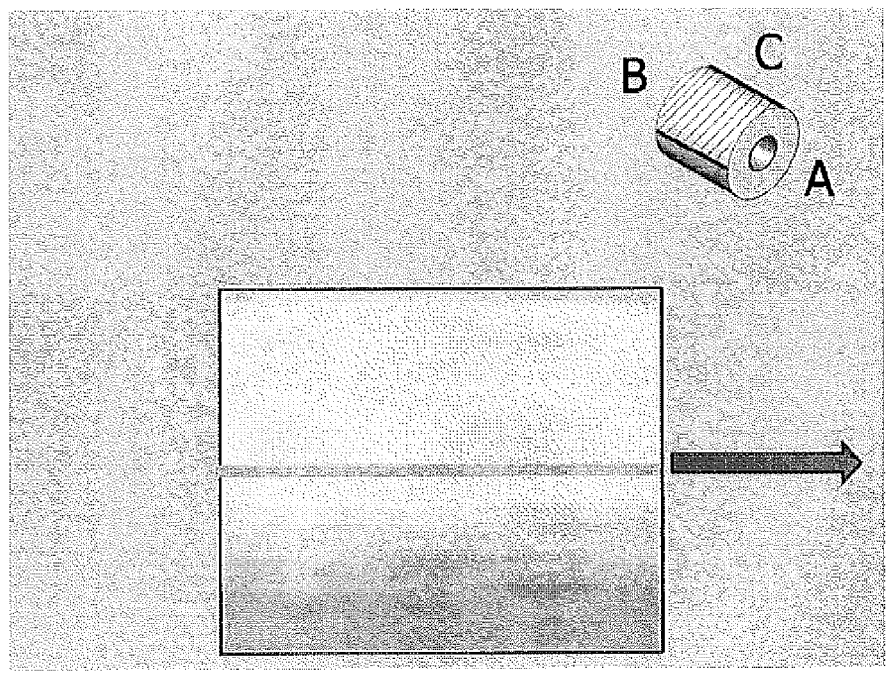

Advantageously, the unit 400 is configured to—or comprises electronic processing means of the unit, or respective electronic processing means of the plant the unit is installed in or cooperates with, which are configured to—determine the length of the product or roll by determining the distance between the longitudinal end edges, or between the transverse end faces, of the product or roll, as may be inferred from FIG. 21E. The sensitivity threshold which distinguishes between a product whose length is unacceptably different from a nominal value, and which is therefore non-conforming, and a conformant product or roll, can be set manually by the operator from respective means, in particular from the respective operator panel 46 of the unit 400 itself.

Advantageously, detection of an incorrectly positioned product or roll is carried out by way of images captured by the top camera means 14.

Figure 21F:
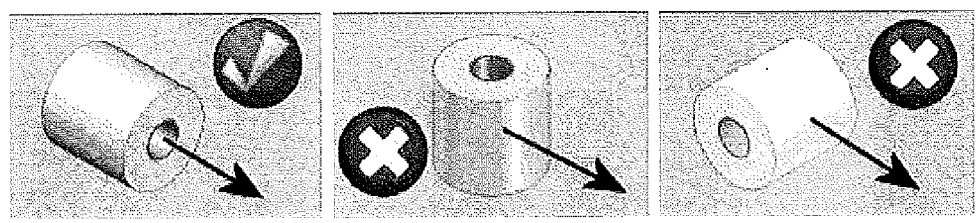

Advantageously, the unit 400 is configured to—or comprises electronic processing means of the unit, or respective electronic processing means of the plant the unit is installed in or cooperates with, which are configured to—determine the presence of an incorrectly positioned product or roll by determining whether the vertical axis of the product or roll corresponds to its longitudinal feed direction or is transversely rotated by 90° to the longitudinal or feed direction, as may be inferred from FIG. 21F. The sensitivity threshold which distinguishes between product or roll which is an incorrectly positioned and which is therefore non-conforming, and a conformant product or roll, can be set manually by the operator from respective means, in particular from the respective operator panel 46 of the unit 400 itself.

Advantageously, detection of an oblique transverse face, resulting from an oblique cut, of the product or roll is carried out by way of images captured by the top camera means 14.

Figure 21G:
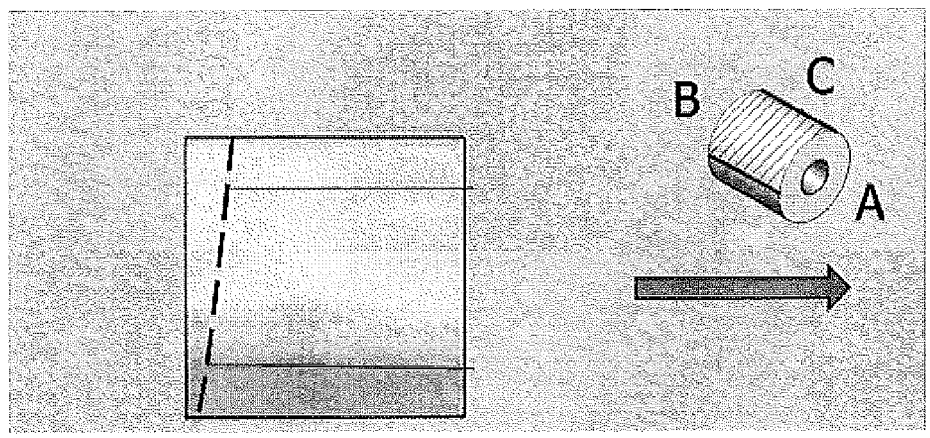

Advantageously, the unit 400 is configured to—or comprises electronic processing means of the unit, or respective electronic processing means of the plant the unit is installed in or cooperates with, which are configured to—determine the presence of an oblique transverse face by determining the distance between the longitudinal end edges of the product or roll at two different transverse positions or at two respective, longitudinal lines which are transversely spaced from each other, as may be inferred from FIG. 21G. The sensitivity threshold which distinguishes between a product having a transverse face which is unacceptably oblique compared to a nominal value, and which is therefore non-conforming, and a conformant product or roll, can be set manually by the operator from respective means, in particular from the respective operator panel 46 of the unit 400 itself.

Advantageously, detection of surface irregularities such as rips, tears or dirt on the outside surface of the product or roll is carried out by way of images captured by the top camera means 14.

Figure 21H:
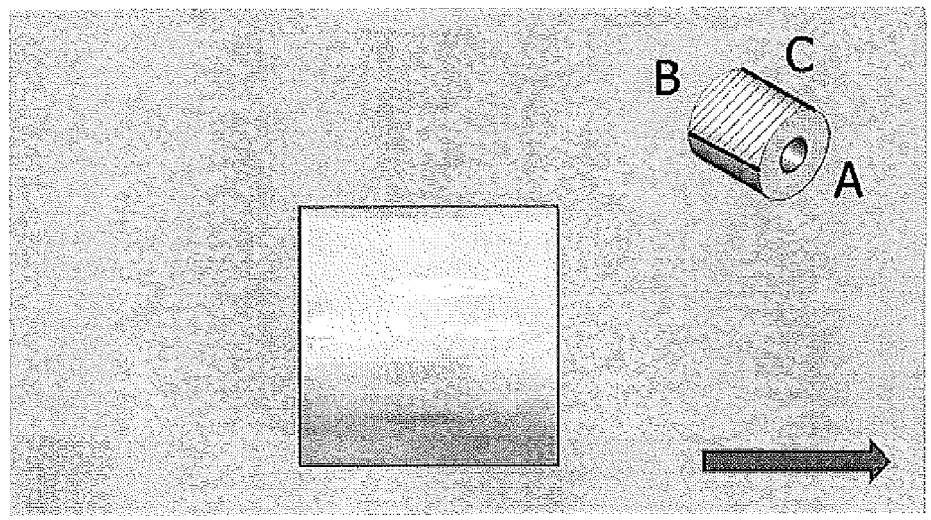

Advantageously, the unit 400 is configured to—or comprises electronic processing means of the unit, or respective electronic processing means of the plant the unit is installed in or cooperates with, which are configured to—determine the area of the respective outside surface of the product or roll whose surface differs from the rest of the same outside surface of the same product or roll, as may be inferred from FIG. 21H. The sensitivity threshold which distinguishes between a product whose outside surface is unacceptably dirty, and which is therefore non-conforming, and a conformant product, can be set manually by the operator from respective means, in particular from the respective operator panel 46 of the unit 400 itself.

Advantageously, detection of a roll with an unglued and hence loosely hanging end edge is carried out by way of images captured by the front and/or rear camera means 16, 18 and by the top camera means 14.

Advantageously, the unit for the control or management of products or rolls can be applied to an existing conveying line, where the conveying means of the plant, are controlled, in particular, by the control means of the plant and are made to move through the unit itself to allow the control or management unit to detect and, if necessary, eliminate the products, so that, in effect, they define the conveying means of the control or management unit itself.

The invention described above is susceptible of industrial application. It would be obvious to one skilled in the art that several changes and modifications can be made to the invention without departing from the spirit and scope of the invention, described in depth above.

It is also easy to imagine further embodiments of the invention comprising one or more of the features described herein. Moreover, it will be understood that all the details of the invention may be substituted for technically equivalent elements.

The invention claimed is:

1. A unit for control or management of paper rolls in a plant having an operating line with multiple sections for making and packaging the paper rolls; the unit comprising:
    a conveying section for conveying the paper rolls, the conveying section including:
        a first conveying device, a second conveying device, and a drop zone positioned between the first conveying device and the second conveying device, with the first conveying device being positioned upstream of the drop zone and the second conveying device being positioned downstream of the drop zone,
        wherein at least the second conveying device has a movable end movable longitudinally or telescopically, relative to a fixed portion of the first conveying device, between an advanced position supporting and conveying the paper rolls and a retracted position allowing the paper rolls to drop in the drop zone,
        wherein the movable end is positioned high enough above a bottom surface of the drop zone to allow the movable end to return to the advanced position while one of the paper rolls is underneath in the drop zone;
    an electronic process controller configured for controlling functioning of the sections;
    a detection device for detecting a defective paper roll; and
    an eliminating device for eliminating the defective paper roll, the eliminating device including the movable end;
    wherein the electronic process controller is configured to determine one or more of:
        a diameter of the roll by determining a distance between transverse or lateral edges of the roll;
        a length of the roll by determining a distance between longitudinal end edges or between transverse end faces of the roll; or
        a presence of an oblique transverse face by determining a distance between longitudinal end edges of the roll at two different transverse positions or at two respective, longitudinal lines which are transversely spaced from each other.

2. The unit according to claim 1, wherein the eliminating device is configured to move a product support to allow the defective paper roll to drop under the product support.

3. The unit according to claim 1, wherein the end portion comprises a body, mounting respective rollers, or sliding surfaces for corresponding belts, and is longitudinally movable, relative to a fixed body mounting respective rollers or sliding surfaces for the belts.

4. The unit according to claim 3, wherein the end portion comprises an end roller defining at least a portion of a transport surface for the paper rolls and a return roller, which is positioned longitudinally spaced from, and perpendicularly lower than, the end roller.

5. The unit according to claim 4, wherein the fixed body comprises a further end roller defining a further portion of the transport surface for the paper rolls, and a further return roller, which is positioned longitudinally spaced from, and perpendicularly lower than, the further end roller, the further return roller defining with the return roller a section of variable length for compensating for extension of the corresponding belts.

6. The unit according to claim 5, wherein the further return roller includes first and second return rollers for the belts.

7. The unit according to claim 1, wherein the eliminating device is configured to advance the defective paper roll towards the drop zone while moving the movable end away from the drop zone.

8. The unit according to claim 7, wherein the eliminating device bypasses the eliminating for non-defective ones of the paper rolls by moving the movable end toward the drop zone.

9. The unit according to claim 1, wherein the eliminating device is configured to cause others of the paper rolls to advance while causing the defective paper roll to advance towards the drop zone and/or allowing the defective paper roll to drop.

10. The unit according to claim 1, and further comprising an image capture unit configured to capture an image of the defective paper roll.

11. The unit according to claim 1, wherein the detection device includes a camera configured to capture one or more images of the paper rolls.

12. The unit according to claim 11, wherein the electronic process controller is configured to receive the one or more images from the camera and process the one or more images to determine whether respective ones of the paper rolls are defective.

13. The unit according to claim 1, wherein the electronic process controller includes programming and software, and is configured to drive a display.

14. The unit according to claim 1, wherein the eliminating device is located immediately downstream of the detection device and the conveying section conveys the paper rolls for both the detection device and the eliminating device.

15. The unit according to claim 1, and further comprising a support supporting both the detection device and the eliminating device.

16. The unit according to claim 1, wherein the electronic process controller is configured to determine an acceptable or defective paper roll from a value which is determined, or calculated, for a parameter representing a particular characteristic of the paper roll, an acceptability or defectiveness of the paper roll being, differentiated or classified based on a predetermined threshold value with which the determined or calculated value is compared.

17. The unit according to claim 16, wherein the predetermined threshold value, relates to one or more of the following defects:
   non-conforming printing of a logo on the paper roll,
   irregularities on an outside surface of the paper roll,
   a misshapen core of the paper roll,
   an incorrectly positioned paper roll,
   a dirty paper roll,
   a paper roll with an unglued end edge.

18. A unit for control or management of paper rolls in a plant having an operating line with multiple sections for making and packaging the paper rolls; the unit comprising:
   a conveying section for conveying the paper rolls, the conveying section including:
      a first upstream conveying device and a second downstream conveying device,
      wherein at least the second downstream conveying device has a movable end movable longitudinally or telescopically, relative to a fixed portion of the first upstream conveying device, between an advanced position supporting and conveying the paper rolls and a retracted position allowing the paper rolls to drop,
      wherein the movable end is positioned high enough above a bottom surface under the movable end to allow the movable end to return to the advanced position while one of the paper rolls is still underneath the movable end;
   a detecting system, including a camera suitable for detecting characteristics of the paper rolls;
   an electronic process controller suitable for receiving and processing information from the detecting system and determining a state or condition of the paper rolls,
   wherein the state or condition includes at least one chosen from:
   a non-defective paper roll; and
   a defective paper roll;
   a system for eliminating the defective paper roll from the unit, the system for eliminating including the movable end;
   wherein the electronic process controller is configured to determine a diameter of the paper roll by determining a distance between transverse or lateral edges of the paper roll, based on the information received from the detecting system and for activating said system for eliminating the defective paper roll to eliminate the defective paper roll from the unit;
   wherein the electronic process controller is configured to process the one or more images to determine if the paper rolls include one or more of the following defects:
   non-conforming printing of a logo on the paper roll,
   irregularities on an outside surface of the paper roll,
   a non-conforming length of the paper roll,
   an end of the paper roll that is cut obliquely,
   a misshapen core of the paper roll,
   an incorrectly positioned paper roll,
   a dirty paper roll,
   a paper roll with an unglued end edge.

19. A unit for control or management of paper rolls in a plant having an operating line with multiple sections for making and packaging the paper rolls; the unit comprising:
   a conveying section for conveying the paper rolls, the conveying section including:
      a first conveying device, a second conveying device, and a drop zone positioned between the first conveying device and the second conveying device, with the first conveying device being positioned upstream of the drop zone and the second conveying device being positioned downstream of the drop zone,
      wherein at least the second conveying device has a movable end movable longitudinally or telescopically, relative to a fixed portion of the first conveying device, between an advanced position supporting and conveying the paper rolls and a retracted position allowing the paper rolls to drop in the drop zone,
      wherein the movable end is positioned high enough above a bottom surface of the drop zone to allow the movable end to return to the advanced position while one of the paper rolls is underneath in the drop zone;
   a detecting system, including a camera suitable for detecting characteristics of the paper rolls;
   an electronic process controller suitable for receiving and processing information from the detecting system and determining a state or condition of the paper rolls,
   wherein the state or condition includes at least one chosen from:
   a non-defective paper roll; and
   a defective paper roll;
   a system for eliminating the defective paper roll from the unit, the system for eliminating including the movable end;
   wherein the electronic process controller is configured to determine a length of the paper roll by determining a distance between longitudinal end edges between transverse end faces of the roll, based on the information received from the detecting system, for activating said system for eliminating the defective paper roll to eliminate the defective paper roll from the unit;
   wherein the electronic process controller is configured to process the one or more images to determine if the paper rolls include one or more of the following defects:
   non-conforming printing of a logo on the paper roll, irregularities on an outside surface of the paper roll,
an end of the paper roll that is cut obliquely,
a misshapen core of the paper roll,
an incorrectly positioned paper roll,
a dirty paper roll,
a paper roll with a non-conforming diameter,
a paper roll with an unglued end edge.

20. A unit for control or management of paper rolls in a plant having an operating line with multiple sections for making and packaging the paper rolls; the unit comprising:
a conveying section for conveying the paper rolls, the conveying section including:
a first conveying device, a second conveying device, and a drop zone positioned between the first conveying device and the second conveying device, with the first conveying device being positioned upstream of the drop zone and the second conveying device being positioned downstream of the drop zone,
wherein at least the second conveying device has a movable end movable longitudinally or telescopically, relative to a fixed portion of the first conveying device, between an advanced position supporting and conveying the paper rolls and a retracted position allowing the paper rolls to drop in the drop zone,
wherein the movable end is positioned high enough above a bottom surface of the drop zone to allow the movable end to return to the advanced position while one of the paper rolls is underneath in the drop zone;
a detecting system, including a camera suitable for detecting characteristics of the paper rolls;
an electronic process controller suitable for receiving and processing information from the detecting system and determining a state or condition of the paper rolls,
wherein the state or condition includes at least one chosen from:
a non-defective paper roll; and
a defective paper roll;
a system for eliminating the defective paper roll from the unit, the system for eliminating including the movable end;
wherein the electronic process controller is configured to determine a presence of an oblique transverse face by determining a distance between longitudinal end edges of the roll at two different transverse positions or at two respective longitudinal lines which are transversely spaced from each other, and for activating said system for eliminating the defective paper roll to eliminate the defective paper;
wherein the electronic process controller is configured to process the one or more images to determine if the paper rolls include one or more of the following defects:
non-conforming printing of a logo on the paper roll,
irregularities on an outside surface of the paper roll,
a non-conforming length of the paper roll,
a misshapen core of the paper roll,
an incorrectly positioned paper roll,
a dirty paper roll,
a paper roll with a non-conforming diameter,
a paper roll with an unglued end edge.

21. A unit for control or management of paper rolls in a plant having an operating line with multiple sections for making and packaging the paper rolls; the unit comprising:
a conveying section for conveying the paper rolls, the conveying section including:
a first conveying device, a second conveying device, and a drop zone positioned between the first conveying device and the second conveying device, with the first conveying device being positioned upstream of the drop zone and the second conveying device being positioned downstream of the drop zone,
wherein at least the second conveying device has a movable end movable longitudinally or telescopically, relative to a fixed portion of the first conveying device, between an advanced position supporting and conveying the paper rolls and a retracted position allowing the paper rolls to drop in the drop zone,
wherein the movable end is positioned high enough above a bottom surface of the drop zone to allow the movable end to return to the advanced position while one of the paper rolls is underneath in the drop zone;
a detecting system, including a camera suitable for capturing images of the paper rolls to detect characteristics of the paper rolls;
an electronic process controller suitable for receiving and processing information from the detecting system and determining a state or condition of the paper rolls,
wherein the state or condition includes at least one chosen from:
a non-defective paper roll; and
a defective paper roll;
a system for eliminating the defective paper roll from the unit, the system for eliminating including the movable end;
wherein the electronic process controller is configured to process the images captured and to determine one or more of:
a diameter of the roll by determining a distance between transverse or lateral edges of the roll;
a length of the roll by determining a distance between longitudinal end edges or between transverse end faces of the roll; or
a presence of an oblique transverse face by determining a distance between longitudinal end edges of the roll at two different transverse positions or at two respective, longitudinal lines which are transversely spaced from each other;
and wherein the electronic process controller is configured to activate said system for eliminating the defective paper roll upon detecting the defective paper roll to eliminate the defective paper roll from the unit.

22. A unit for control or management of paper rolls in a plant having an operating line with multiple sections for making and packaging the paper rolls; the unit comprising:
a conveying section for conveying the paper rolls, the conveying section including:
a first conveying device, a second conveying device, and a drop zone positioned between the first conveying device and the second conveying device, with the first conveying device being positioned upstream of the drop zone and the second conveying device being positioned downstream of the drop zone,
wherein at least the second conveying device has a movable end movable longitudinally or telescopically, relative to a fixed portion of the first conveying device, between an advanced position supporting and conveying the paper rolls and a retracted position allowing the paper rolls to drop in the drop zone,
wherein the movable end is positioned high enough above a bottom surface of the drop zone to allow the movable end to return to the advanced position while one of the paper rolls is underneath in the drop zone;
a detecting system, including a camera suitable for detecting characteristics of the paper rolls;

an electronic process controller suitable for receiving and processing information from the detecting system and determining a state or condition of the paper rolls,
wherein the state or condition includes at least one chosen from:
a non-defective paper roll; and
a defective paper roll;
a system for eliminating the defective paper roll from the unit, the system for eliminating including the movable end;
wherein the electronic processing controller is configured to determine the state or condition from a value which is determined, or calculated, for a parameter representing a specific characteristic of the paper rolls, the state or condition being differentiated or classified based on a predetermined threshold value with which the determined or calculated value representing the specific characteristic of the paper rolls is compared;
wherein the predetermined threshold value relates to one or more of
   a diameter of the roll by determining a distance between transverse or lateral edges of the roll;
   a length of the roll by determining a distance between longitudinal end edges or between transverse end faces of the roll; or
   a presence of an oblique transverse face by determining a distance between longitudinal end edges of the roll at two different transverse positions or at two respective, longitudinal lines which are transversely spaced from each other;
and wherein the electronic process controller is configured to activate said system for eliminating the defective paper roll upon detecting the defective paper roll to eliminate the defective paper roll from the unit.

23. A plant for making and packaging paper rolls, comprising:
at least one operating line including at least one upstream section for making the paper rolls, including a log saw for cutting the paper rolls off respective elongate paper logs,
at least one primary packaging section configured to pack the paper rolls;
at least one further packaging section configured to perform at least one chosen from bag packs of the paper rolls and place the bags or packs on a pallet;
a conveying section configured to transport or means, by which the products are transported between sections of the plant, the conveying section including a section positioned between the at least one upstream section for making the paper rolls and the at least one further packaging section;
the unit according to claim 1.

* * * * *